United States Patent [19]

Jannson et al.

[11] Patent Number: 5,838,403
[45] Date of Patent: Nov. 17, 1998

[54] LIQUID CRYSTAL DISPLAY SYSTEM WITH INTERNALLY REFLECTING WAVEGUIDE FOR BACKLIGHTING AND NON-LAMBERTIAN DIFFUSING

[75] Inventors: Joanna L. Jannson; Tomasz P. Jannson, both of Torrance; Jeremy M. Lerner, Culver City, all of Calif.

[73] Assignee: Physical Optics Corporation, Torrance, Calif.

[21] Appl. No.: 601,133

[22] Filed: Feb. 14, 1996

[51] Int. Cl.⁶ .................................................. G02F 1/33
[52] U.S. Cl. .................................. 349/65; 349/64; 362/26
[58] Field of Search .................................. 349/65, 62, 64, 349/67; 359/599; 385/901, 129, 130, 146; 362/26, 29, 27

[56] References Cited

U.S. PATENT DOCUMENTS

| | | | |
|---|---|---|---|
| 4,099,172 | 7/1978 | Montanari et a. | 340/336 |
| 4,140,378 | 2/1979 | Suzuki et al. | 354/53 |
| 4,299,462 | 11/1981 | Suzuki et al. | 354/53 |
| 4,344,686 | 8/1982 | Stemme et al. | 354/198 |
| 4,431,260 | 2/1984 | Palmer | 350/96.15 |
| 4,497,860 | 2/1985 | Brady, Jr. | 428/156 |
| 4,906,070 | 3/1990 | Cobb, Jr. | 350/286 |
| 4,917,465 | 4/1990 | Conner et al. | 350/335 |
| 4,963,016 | 10/1990 | Heijnemans et al. | 353/74 |
| 4,975,808 | 12/1990 | Bond et al. | 362/31 |
| 4,989,948 | 2/1991 | Dreyer, Jr. | 350/97 |
| 5,050,946 | 9/1991 | Hathaway et al. | 385/33 |
| 5,053,803 | 10/1991 | Suda et al. | 354/466 |
| 5,056,892 | 10/1991 | Cobb, Jr. | 359/831 |
| 5,128,783 | 7/1992 | Abileah et al. | 359/49 |
| 5,134,548 | 7/1992 | Turner | 362/29 |
| 5,161,041 | 11/1992 | Abileah et al. | 359/40 |
| 5,161,873 | 11/1992 | Obata | 362/31 |
| 5,187,765 | 2/1993 | Muehlemann et al. | 385/115 |
| 5,202,950 | 4/1993 | Arego et al. | 385/146 |
| 5,226,105 | 7/1993 | Myers | 385/147 |
| 5,237,164 | 8/1993 | Takada | 235/487 |
| 5,237,641 | 8/1993 | Jacobson et al. | 385/146 |
| 5,253,089 | 10/1993 | Imai | 359/49 |
| 5,253,151 | 10/1993 | Mepham et al. | 362/216 |
| 5,262,880 | 11/1993 | Abileah | 359/40 |
| 5,295,048 | 3/1994 | Park et al. | 349/65 |
| 5,295,051 | 3/1994 | Cowling | 362/32 |
| 5,351,151 | 9/1994 | Levy | 359/240 |

(List continued on next page.)

OTHER PUBLICATIONS 36.2: Viewing–Angle–Enhancement System for LCD's, S.Zimmerman et al., SID 95 Digest, pp. 793–796.
Cold Cathode Lamps: LCD Lighting, Inc. 1994, Technical Bulletin, 2 pages.

*Primary Examiner*—William L. Sikes
*Assistant Examiner*—Kenneth Parker
*Attorney, Agent, or Firm*—Nilles & Nilles, S.C.

[57] ABSTRACT

Systems and methods for providing an LCD with a collimated backlight and a non-Lambertian diffuser are described. An LCD system includes: an illumination source for producing light; a collimating waveguide optically connected to the illumination source, the collimating waveguide including a top surface, an incident end and a plurality of substantially parallel optical elements for redirecting light from the incident end to, and through, the top surface, each of the plurality of substantially parallel optical elements including a first facet that is nonparallel to the top surface and a second facet that is nonparallel to the top surface; a reflector optically connected to the light source and optically connected to the collimating waveguide, the reflector (1) at least partially surrounding the illumination source, and (2) reflecting light from said illumination source to said incident end by direct reflection; a liquid crystal display optically connected to the collimating waveguide; and a non-Lambertian diffuser optically connected to the liquid crystal display for directing light from said liquid crystal display. The light from the reflector is directly incident upon the incident end. The systems and methods provide advantages in that the light from the LCD is bright and homogenous.

67 Claims, 10 Drawing Sheets

U.S. PATENT DOCUMENTS

| | | | |
|---|---|---|---|
| 5,359,691 | 10/1994 | Tai et al. | 385/146 |
| 5,361,119 | 11/1994 | Shida et al. | 354/409 |
| 5,363,470 | 11/1994 | Wortman | 385/147 |
| 5,381,309 | 1/1995 | Borchardt | 362/31 |
| 5,390,276 | 2/1995 | Tai et al. | 385/146 |
| 5,394,255 | 2/1995 | Yokota et al. | 349/64 |
| 5,394,308 | 2/1995 | Watanabe et al. | 362/31 |
| 5,396,350 | 3/1995 | Beeson et al. | 359/40 |
| 5,398,125 | 3/1995 | Willett et al. | 359/41 |
| 5,410,421 | 4/1995 | Huignard et al. | 359/15 |
| 5,428,468 | 6/1995 | Zimmerman et al. | 359/40 |
| 5,467,208 | 11/1995 | Kokawa et al. | 359/49 |
| 5,467,417 | 11/1995 | Nakamura et al. | 385/36 |
| 5,594,830 | 1/1997 | Winston et al. | 385/901 |
| 5,600,455 | 2/1997 | Ishikawa et al. | 349/64 |
| 5,600,462 | 2/1997 | Suzuki et al. | 349/112 |

$G = 100 \mu m \quad \beta = 40 \text{ DEGREES}$

LIQUID CRYSTAL DISPLAY SYSTEM WITH INTERNALLY REFLECTING WAVEGUIDE FOR BACKLIGHTING AND NON-LAMBERTIAN DIFFUSING

BACKGROUND OF THE INVENTION

1. Field of the Invention

The present invention relates in general to the field of liquid crystal display (LCD) systems. More particularly, the present invention relates to a liquid crystal display that is illuminated with collimated backlighting. In a preferred embodiment, the present invention relates to a liquid crystal display system that includes a collimating backlight and a non-Lambertian diffuser. The present invention thus relates to liquid crystal display systems of the type that can be termed collimated backlit non-Lambertian diffused.

2. Discussion of the Related Art

Within this application, several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Historically, it has been known in the prior art to illuminate liquid crystal displays. Liquid crystal displays of the type hereunder consideration are well-known to those skilled in the art. A conventional liquid crystal display is typically illuminated with a backlight device. Such a backlight device typically includes an illumination source located at one edge of a planar waveguide. For example, prior art liquid crystal display backlights have been based on a rectilinear waveguide having a transparent top surface and a metallized bottom surface. Such backlights are conventionally powered by a single fluorescent lamp located at one edge of the rectilinear waveguide, or by two lamps located at two edges.

As is known to those skilled in the art, the light from such an illumination source must be coupled into the waveguide in order to illuminate the liquid crystal display. In the past, this coupling has been inefficient. Thus, a previously recognized problem has been that much of the light available from the illumination source is wasted resulting in decreased brightness. Needless to say, it is desirable to provide a backlit liquid crystal display having higher brightness.

What is needed therefore is an apparatus that efficiently couples light from the illumination source into the waveguide. However, efficient coupling between the illumination source and the waveguide is not sufficient. Liquid crystal displays require collimated incident light and include a polarizer. Therefore, what is also needed is an apparatus that collimates and redirects the light from the illumination source so that the maximum amount of light from the illumination source can be coupled through the polarizer of the liquid crystal display. Collimation involves minimizing divergence. What is also needed is an apparatus that not only increases the brightness, but also provides anamorphic, (i.e., non-Lambertian), illumination, (e.g., different divergences in the horizontal and vertical directions).

Another previously recognized problem has been that liquid crystal displays are not bright enough for use in high ambient light conditions. Therefore, what is also needed is an apparatus that increases the brightness of a liquid crystal display. By increasing the overall coupling efficiency, a liquid crystal display will appear brighter. Alternatively, a lower power illumination source can be used to achieve the same brightness. Needless to say, it is desirable to provide a backlit liquid crystal display having lower power consumption.

Another previously recognized problem has been that the light transmitted through liquid crystal display systems is not homogeneous. Typically, the area of the liquid crystal display that is closest to the illumination source, or illumination spots, will be brighter. Therefore, what is also needed is a backlit liquid crystal display with more homogenous light distribution.

One unsatisfactory previously recognized approach, which attempts to solve the efficiency and homogeneity problems referred to herein, involves replacing the metallized bottom surface with a surface that includes a number of white dots. The density of the dots is proportional to the distance to the illumination source so that the backlight illuminates a liquid crystal display with greater homogeneity. However, this previously recognized approach has the disadvantage of relatively low coupling efficiency. Further, this previously recognized approach also has the disadvantage that the white dots do not collimate the light.

Moreover, this previously recognized approach also has the disadvantage of relatively high cost. The manufacture and sale of LCD systems is a competitive business. A preferred solution will be seen by the end-user as being cost effective. Therefore, what is also needed is a liquid crystal display system that is cost effective. A solution is cost effective when it is seen by the end-user as compelling when compared with other potential uses that the end-user could make of limited resources.

Yet another previously recognized problem has been that much of the light transmitted through liquid crystal display systems is wasted because it is not seen. The eyes of a viewer occupy a relatively localized position with respect to the liquid crystal display. The liquid crystal display will appear brighter if the light that is available from the liquid crystal display is directed to the viewer's eye. Therefore, what is also need is a backlit liquid crystal display having directionality. Heretofore the above-discussed requirements have not been fully met.

The below-referenced U.S. patents, and allowed U.S. application in which the issue fee will be paid, disclose embodiments that were at least in-part satisfactory for the purposes for which they were intended. The disclosures of all the below-referenced prior U.S. patents and application, in their entireties, are hereby expressly incorporated by reference into the present application for purposes including, but not limited to, indicating the background of the present invention and illustrating the state of the art.

U.S. Pat. No. 5,390,276 discloses a backlight assembly utilizing microprisms. U.S. Pat. No. 5,365,354 discloses a GRIN type diffuser based on volume holographic material. U.S. Pat. No. 5,359,691 discloses a backlighting system with a multi-reflection light injection system. U.S. Pat. No. 5,253,151 discloses luminaire for use in backlighting a liquid crystal display matrix. U.S. Pat. No. 5,050,946 discloses a faceted light pipe. U.S. Pat. No. 5,202,950 discloses a backlighting system with faceted light pipes. U.S. Ser. No. 08/393,050 discloses a light source destructuring and shaping device.

SUMMARY AND OBJECTS OF THE INVENTION

By way of summary, the present invention is directed to a liquid crystal display system having a collimating backlight and a non-Lambertian diffuser. An effect of the present invention is to project light through a liquid crystal display.

A primary object of the invention is to provide an apparatus that efficiently couples light from the illumination source into the waveguide. Another object of the invention is to provide an apparatus that collimates the light from the illumination source so that the maximum amount of light from the illumination source can be coupled through the polarizer of the liquid crystal display. Another object of the invention is to provide an apparatus that increases the brightness of a liquid crystal display. Another object of the invention is to provide an apparatus having lower power consumption. Another object of the invention is to provide an apparatus with more homogenous light distribution. Another object of the invention is to provide an apparatus that is cost effective. Another object of the invention is to provide an apparatus having directionality. Another object of the invention is to provide an apparatus that is rugged and reliable, thereby decreasing down time and operating costs. Another object of the invention is to provide an apparatus that has one or more of the characteristics discussed above but which is relatively simple to manufacture and assemble using a minimum of equipment.

In accordance with a first aspect of the invention, these objects are achieved by providing an apparatus comprising an illumination source for producing light; a first distributed wedge collimating waveguide optically connected to said illumination source, said first distributed wedge collimating waveguide including a top surface, an incident end and a first plurality of substantially parallel optical elements for redirecting light from said incident end to said top surface and through said top surface by leakage, each of said first plurality of substantially parallel optical elements including a first facet that is nonparallel to said top surface and a second facet that is nonparallel to said top surface; a second distributed wedge collimating waveguide optically connected to said first distributed wedge collimating waveguide, said second distributed wedge collimating waveguide including an upper surface and a second plurality of substantially parallel optical elements for redirecting light that is leaked through said top surface through said upper surface; and a reflector optically connected to said light source and optically connected to said first distributed wedge collimating waveguide, said reflector (1) at least partially surrounding said illumination source, and (2) reflecting light from said illumination source to said incident end by direct reflection. In one embodiment, a liquid crystal display is optically connected to said upper surface and a non-Lambertian diffuser is optically connected to said liquid crystal display for directing light from said liquid crystal display.

Another object of the invention is to provide a method that can be used to illuminate a liquid crystal display. Another object of the invention is to provide a method that is predictable and reproducible, thereby decreasing variance and operating costs. Another object of the invention is to provide a method that has one or more of the characteristics discussed above but which is which is relatively simple to setup and operate using relatively low skilled workers.

In accordance with a second aspect of the invention, these objects are achieved by providing a method of illuminating a liquid crystal display which utilizes an apparatus comprising: an illumination source; a first collimating waveguide optically connected to said illumination source, said first collimating waveguide including a top surface, an incident end and a first plurality of substantially parallel optical elements for redirecting light from said incident end to, and through, said top surface each of said first plurality of substantially parallel optical elements including a first facet that is nonparallel to said top surface and a second facet that is nonparallel to said top surface; a second collimating waveguide optically connected to said first collimating waveguide, said second collimating waveguide including an upper surface and a second plurality of substantially parallel optical elements for redirecting light from said top surface through said upper surface; and a reflector optically connected to said light source and optically connected to said first distributed wedge collimating waveguide, wherein each of said second plurality of substantially parallel optical elements is an imaging optic. In one embodiment, the second facet of each of said first plurality of substantially parallel optical elements is concave with respect to said top surface.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which.

DESCRIPTION OF PREFERRED EMBODIMENTS

The present invention and the various features and advantageous details thereof are explained more fully with reference to the nonlimiting embodiments described in detail in the following description. Before describing the present invention in detail, a graphical review of prior art structures in FIGS. 1–2 is in order.

Figure 1:
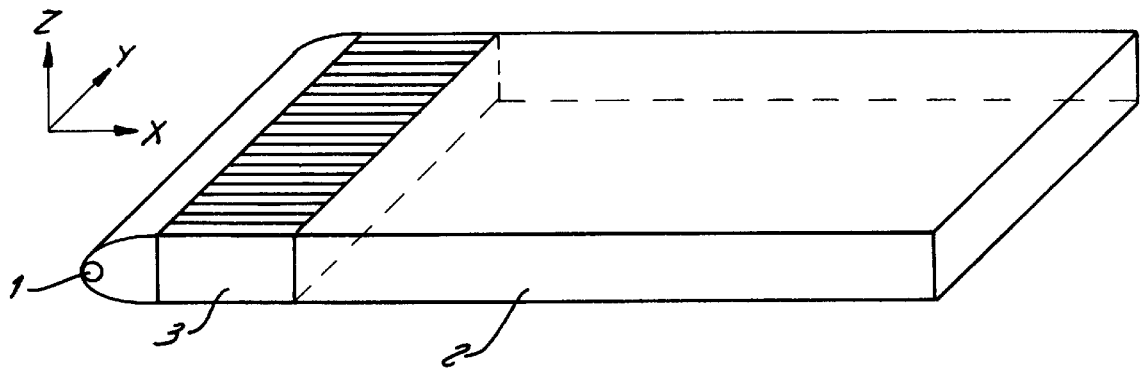
FIG. 1 illustrates a perspective view of a conventional liquid crystal display backlight, appropriately labeled "PRIOR ART"

Referring to FIG. 1, a conventional liquid crystal display backlight is shown where light from illumination source 1 travels to backlighting light pipe 2 through separate light pipe 3. Separate light pipe 3 is divided into a number of laterally adjacent sections.

Figure 2:
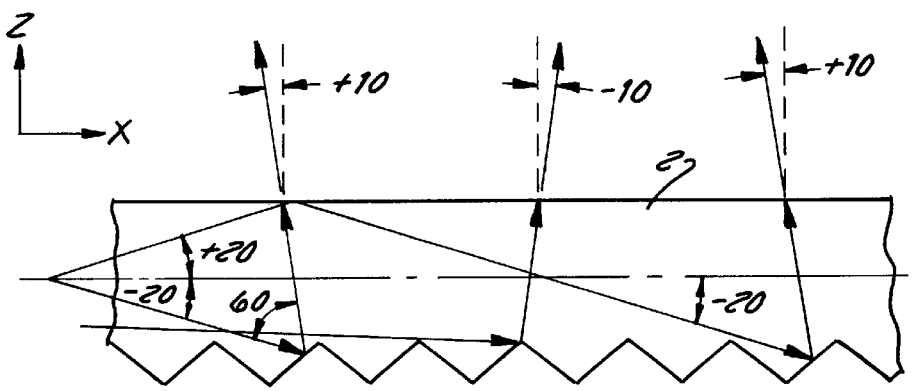
FIG. 2 illustrates a partial sectional view of a portion of the conventional liquid crystal display backlight shown in FIG. 1, appropriately labeled "PRIOR ART"

Referring now to FIG. 2, a partial cross sectional view of the backlighting light pipe 2 in FIG. 1 is shown. The divergence of the incoming light is reduced.

1. SYSTEM OVERVIEW

The above-mentioned requirements of high brightness, low power consumption, homogeneity and directionality are to some extent mutually contradicting and cannot be satisfied simultaneously in the case of a conventional liquid crystal display system. However, it is rendered possible to simultaneously satisfy these requirements to a certain extent by employing a collimating waveguide together with a non-Lambertian diffuser in consideration of the fact that the collimating waveguide tailors the light for use in the liquid crystal display while the non-Lambertian diffuser tailors and homogenizes the light for viewing by an observer.

Figure 4:
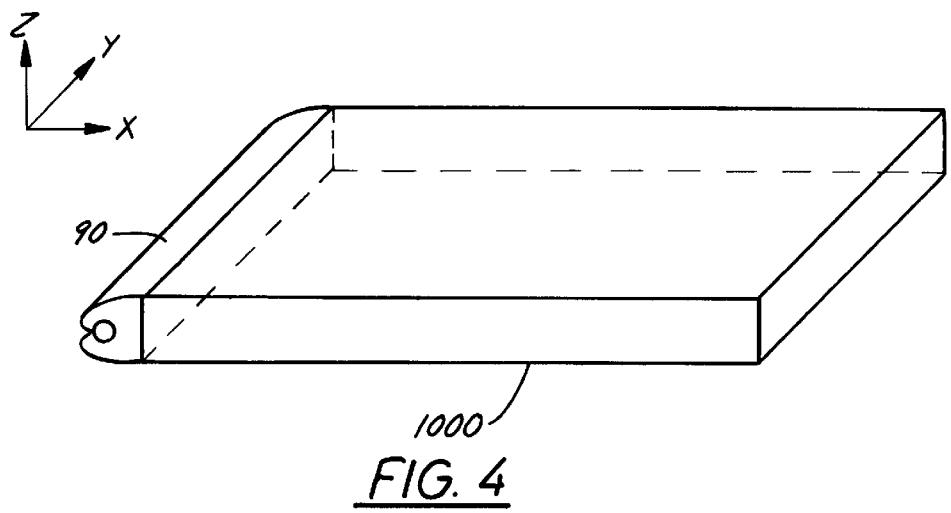
FIG. 4 illustrates a perspective view of a liquid crystal display backlight according to the present invention.

Referring to the drawings, it can be seen that the present invention includes a generally planar collimating waveguide assembly provided with facets. For example, FIG. 4 shows an isometric view of a light engine 90 connected to a waveguide collimator assembly 1000. Pursuant to the present invention, the collimating waveguide assembly can be embodied in several nonmutually exclusive configurations. Subcomponents of these configurations are interchangeable and can be combined.

Figure 3:
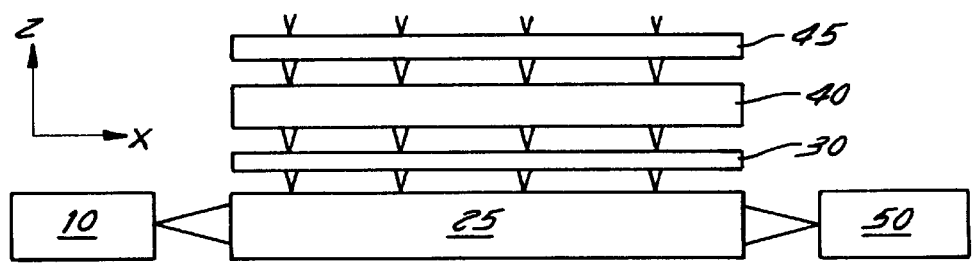
FIG. 3 illustrates a schematic view of a liquid crystal display system according to the present invention.

Referring to FIG. 3, light engine 10 is connected to waveguide collimator 25. Waveguide collimator 25 is connected to homogenizing diffuser 30. Liquid crystal display 40 is connected to diffuser 30. Light shaping diffuser 45 is connected to liquid crystal display 40. An additional light engine 50 can also be connected to waveguide collimator 25. The order of light shaping diff-user 30 and liquid crystal display 40 can be reversed.

2. GENERAL DESCRIPTION

The liquid crystal display system includes several components. These components can include an illumination source, a reflector, one or more nonimaging optics, a collimating waveguide assembly, a diffuser/homogenizer, a liquid crystal display and a non-Lambertian diffuser.

Illumination Sources

According to Liouvilles' theorem, for an optimized light engine, the input distribution is almost uniform; therefore, Lambertian. The following Equation (42) is a result of Liouvilles' theorem. As discussed by Welford and Winston[1] and by Winston and Jannson[2] D is the width of the waveguide. d is the diameter of the emitter, or source. $\beta$ is the output angle in air:

$$d \sin 90° = D \sin \beta \tag{42}$$

The 90° factor in Equation (42) is based on the fact that light is coming from the source in all directions. The optimum light collimating engine, according to Equation (42), provides not only maximum collimation (i.e., minimum angle $\beta$), but also uniform illumination. Those related designs that are almost optimum are also applicable to this invention.

Reflectors

The reflector is preferably an extended source arcuate mirror. The term arcuate describes an arc, or curve in 2, or 3, dimensions. Welford[1] has discussed optimum collimation of light emitted by an extended source, especially spherical and cylindrical sources. The optimum design of the reflector is very characteristic of the intended light source and is not actually parabolic. A parabolic shape is actually unsatisfactory for extended sources. An arcuate mirror structure can provide an ideal fixture for attachment of the light source to the rest of the structure. As the illumination source moves away from the transformer, optimization of the design of the extended source arcuate mirror reflector increases in importance.

Collimating Waveguides

Figure 7:
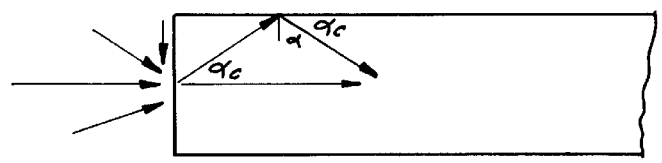
FIG. 7 illustrates a partial sectional view of a collimating waveguide according to the present invention.

In order to be collimated, light must first be coupled into the collimating waveguide. Coupler configurations such as shown in FIG. 7 are well known in the art for use in communications applications. But in the typical communication application, the waveguide, (e.g., optical fiber), has a width of approximately 100 microns, or less. In the present application the width approaches several millimeters.

FIG. 7 represents a theoretical construction of a waveguide into which light is being coupled. Light which is incident normal to the entry edge of the waveguide passes directly into it without being refracted. Light at an angle is refracted. According to Snell's law, low light entering non-normal to the incident surface is collimated. The first case scenario light at 90° is coupled at a critical angle of approximately 40° given an index of refraction for the media of 1.55. The incident angle in the waveguide α is equal to approximately 50°. This value is approximately 50° and larger than $\alpha_c$ so all of the light which enters the waveguide collimator is contained within the waveguide collimator by total internal reflection (TIR). FIG. 7 illustrates that light entering the waveguide will remain trapped within the waveguide due to total internal reflection (TIR). Even for the worst case of 90°, incident angle, the light will still become trapped within the waveguide. The light enters the waveguide under $\alpha_c$, the critical angle, when $$\sin \alpha_c = \frac{1}{n} \; ; \sin \alpha = \sqrt{1 - \left(\frac{1}{n}\right)^2} \quad (45)$$

assuming that the medium outside the waveguide is air and the waveguide is constructed of a transparent material having an index of refraction n. Typical low cost materials from which the waveguide can be fabricated are plastics, adhesives and glass. For these materials, the typical refractive index is approximately 1.55. Therefore, the critical angle, $\alpha_c$, is approximately 40°. Within the waveguide due to trigonometrical relationships a must be equal to approximately 50°. Therefore, all light is trapped within the waveguide because α is greater than $\alpha_c$. For α larger than $\alpha_c$, total internal reflection (TIR) will occur. Total internal reflection (TIR) means that the reflection is exactly 100%. If α is smaller than α. light will be leaked outside the waveguide (leakage not shown). And the leak can be significant, more than 50%. Therefore, there is an abrupt transition when the angle moves from less than $\alpha_c$ to greater than $\alpha_c$. Due to the fact that even for 90° you have an $\alpha_c$ for the transition from air to a material of index 1.55, collimation of the light from the illumination source is provided amounting to a change from an angular range of from 0° to 90° to an angular range of from 0° to approximately 40°. Even without any structural collimating system collimation before entry into the waveguide can occur only when d, diameter of source, is less than D, width of the waveguide. For practical reasons, D should be minimized. Thus, the usefulness of the initial air-material interface collimation is limited by the fact that collimation occurs at the interface. The apparatus disclosed in U.S. Pat. Nos. 5,390,276 and 5,359,691 realize only one collimation factor, this being collimation from the source via a parabolic reflector, which as discussed above is not of optimum shape for an extended source as broadly discussed in Welford[1]. The figures in these patents indicate that the space within the reflector is filled with solid material which zeros the air-material interface collimation factor discussed above. Collimation as discussed in U.S. Pat. Nos. 5,359,691 and 5,390,276 is not actually collimation because of the fact that the triangular prisms which are provided only on the bottom of the backlighting light pipe result in a harvesting of only half of the available light. Moreover, extending the rays out of the media and into the air would result in de-collimation due to Snell's law. This results in de-collimation of 56° corresponding to a half angle of 15.6° versus a half angle of 10°, assuming the index of refraction of the media is 1.55, as before.

Collimating waveguides can be based on either metallic reflection or total internal reflection (TIR). In the first case the waveguide is empty, usually. In the second case the waveguide is material filled. Generally, the second, total internal reflection (TIR) case is better because total internal reflection (TIR) gives exactly 100% reflection while metallic reflection can easily drop to 80% due to surface dirt, contamination. Prior art waveguides for this application generally have one metallized side, for backlighting applications, (e.g., U.S. Pat. No. 5,381,309, the entire contents of which are hereby expressly incorporated by reference). A transformer is a generalized waveguide structure that not only transmits light through the waveguide but can also change the direction of this light. A transformer that changes the direction of light by 90° (orthogonally) can be used to deliberately leak light in a preferred direction for use in an application. Prior art patents show several different ways of designing these leaks. For example, U.S. Pat. No. 5,390,276 discloses the use of a retroreflecting screen polarizer for further collimating the light in order to illuminate an LCD.

A major object of the invention is to provide maximum uniform backlighting for an LCD, and at the same time provide light that is highly collimated. A diffuser homogenizes light, but in order for the diffuser to operate properly with an LCD, the light reaching the diffuser must be collimated. Collimation begins when the light engine incident rays enter the waveguide. Secondary collimation can occur when the light is taken from the horizontal direction and deflected toward the vertical direction within the waveguide.

Figure 5:
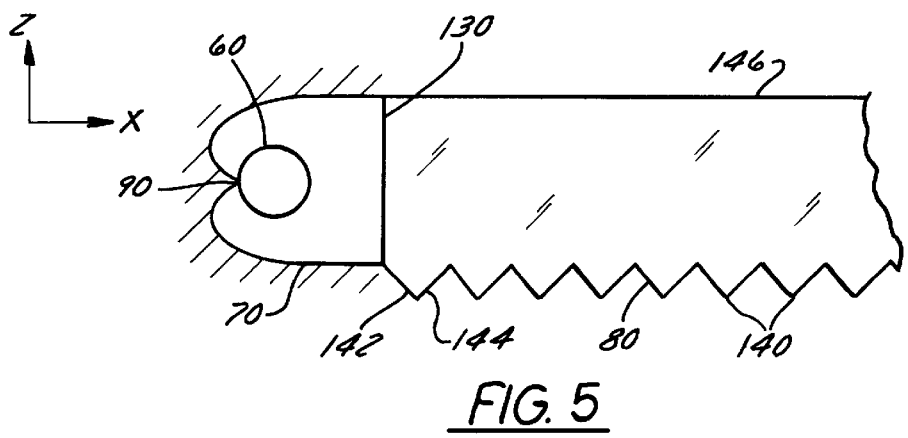
FIG. 5 illustrates a partial sectional view of the liquid crystal display backlight shown in FIG. 4.

This first description concerns collimation which occurs as the light enters the waveguide from the source. One hundred percent collimating efficiency cannot be achieved if the diameter of the source is larger than the diameter of the waveguide. On the other hand, if the diameter of the source is equal to or less than the diameter of the waveguide optimum efficiency can be approached. As a practical matter, losses from the mirrors prohibit 100% coupling. Any discussion of 100% coupling therefore implies that the absorptive losses due to interaction of the light with the mirror is being neglected. Design of the reflector must be optimized for a particular d/D ratio. Welford[1] provides ideal designs for any possible ratio. The ideal design means that the Liouville theorem is satisfied. Satisfaction results in 100% being coupled to the waveguide. The ideal design also means that the distribution of light within the waveguide will be homogenous. Any of the resulting designs will be quite far from being parabolic. A parabolic design is only optimum for a point, or line, source. The volume defined by the interior of the reflector can be filled with a media or be simply air. In either case the interior surface of the reflector must be mirrorized (e.g., metallized). Although the reflection efficiency for deep IR and near IR can approach unity, the reflection efficiency for energy within the visible spectra can easily drop to between 90 and 80% due to inefficiency such as dirt on the surface. Maximum reflection efficiency for any wavelength is approximately 96% assuming a metallized mirror surface. In contrast, total internal reflection (TIR) is always 100%. The metallic is never 100% even in the IR case. Preferably the interior of the reflector should be simply air in order to maximize a collimating effect of Snell's law. Even if the diameter of the source is larger than the thickness of the waveguide the worst case 90° incidence light will be collimated to approximately 40°. Deflection design can still be optimized although it will be impossible to reach 100% coupling. Designs for the large laminar situation will be similar to what is shown in FIG. 5 and even further from parabolic.

Figure 8:
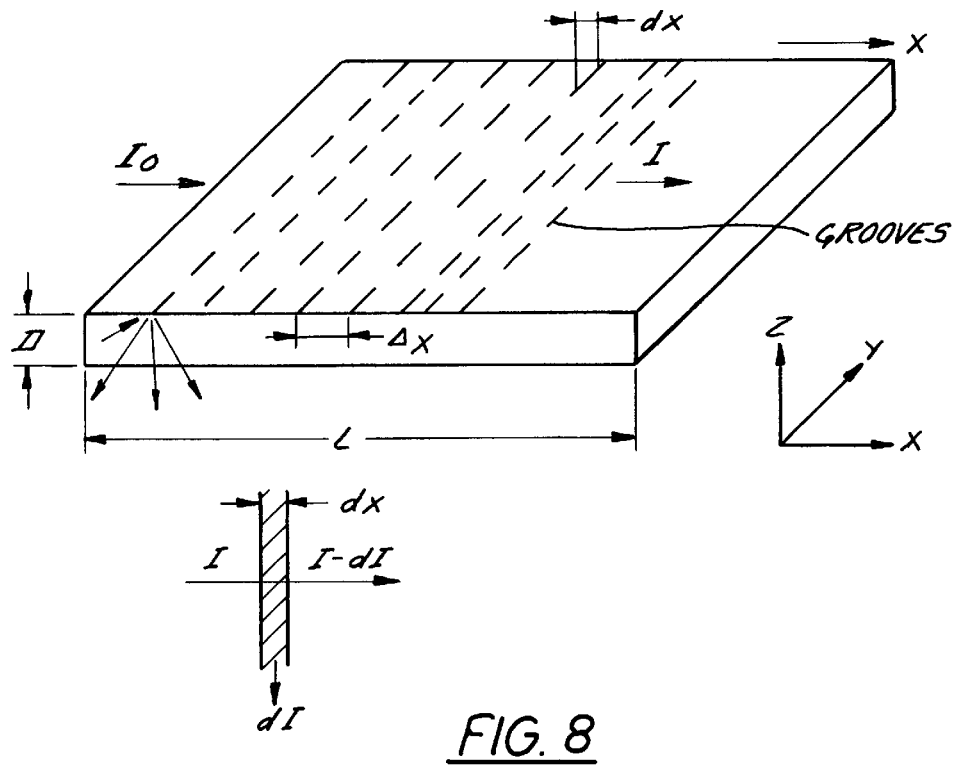
FIG. 8 illustrates a perspective view of a collimating waveguide according to the present invention.

A discussion of the distribution of scattering centers follows. Referring to FIG. 8, the grooves will have variable spacing, $\Delta x$. It should be noted that the microgrooves do not need to be continuous. Note that the scattering centers can be separated which is illustrated by the broken lines. $I_o$ represents incident light coming from the left. I is the intensity after passing through scaler distance x. Total length of the device is L. dx represents an infinitesimally small portion of the scaler distance x. FIG. 8 shows a section with dx illustrated. In the general geometry, I is input intensity from the left, reduced to I–dI because dI is leaked to the bottom. This property holds for any coordinate x. General Equation (1) indicates that the lost leakage of light –dI must be proportional to I.

$$-dI = aI\rho dx \qquad (1)$$

dI is also proportional to the thickness dX, as well as to the density of grooves which is represented by $\rho$. a is a proportionality constant which will be interpreted below. Equation (2) indicates that the density is equal to the number of grooves per unit incremental distance.

$$\rho = \frac{dN}{dx} \qquad (2)$$

So the units for $\rho$ are cm$^{-1}$. I=$I_o$, for x=0. The number of grooves per infinitesimal length dx is dN. $N_t$ is the total number of grooves. In order to preserve uniform leakage, dI must be proportional only to dx. As I necessarily decreases as one moves across the device, $\rho$ must correspondingly increase. Equation (4) is the same as Equation (1) but substituting A for I$\rho$, for uniform leakage condition:

$$dI = -aA dx \qquad (4)$$

Since a and A are both constant integration yields Equation (5).

$$I = I_o - aAx \qquad (5)$$

Equation (6) represents that the density of grooves is equal to a constant divided by Equation (5), following directly:

$$\rho = \frac{A}{I} = \frac{A}{I_o - aAx} \qquad (6)$$

Therefore, $\rho$ is a function of x and increases monotonically from $P_o$. A discussion of the physical meaning of A and a follows. Both are constants.

$$-dI = aI \frac{dN}{dx} dx = aI dN \qquad (6B)$$

Interpreting Equation (6B) yields Equation (6C).

$$I = I_{Io} e^{-aN} \qquad (6C)$$

Equation (7) defines a.

$$a = \frac{-\frac{dI}{I}}{dN} \qquad (7)$$

dI/I represents the relative leakage. dN is the number of grooves per infinitesimal length. a is percentage of leakage per groove. Equation (8) represents that intensity at the full length L is O.

$$aA = \frac{I_o}{L} \qquad (8)$$

Equation (8) represents a singularity because the density of $\rho$ at the full length L cannot reach infinity. For practical purposes, it can be assumed that no more than 5% of the available light is linked all the way to the end. In addition, a mirror can be placed at the end to reflect the light back toward the source. Equation (18) represents aN=3 with the exponent given a value of –3. This, according to Equation (6C), corresponds to 5% of the light being left at the reflective end in the waveguide. This light would be reflected back.

$$aN = 3 \Rightarrow I = I_o e^{-3} \approx 0.05 I_o \qquad (18)$$

Having a higher density would result in less light left at the end of the length, but that could be limited by the physical possibility of compacting the grooves. Equation (20) represents the total number of grooves, equal to the length divided by $\Delta x$ which is the average distance between grooves, $\overline{\Delta x}$:

$$N_T = \frac{L}{\overline{\Delta x}} \qquad (20)$$

The following example uses an average length between grooves of 100 microns across a total length slab of 20 cm yielding a total number of grooves of approximately 2000 as represented in Equation (21).

$$N_T = \frac{20 \text{ cm}}{100 \, \mu m} = \frac{200 \text{ mm}}{0.1 \text{ mm}} = 2000 \qquad (21)$$

Equation (19) can now be calculated because $N_T$ is known.

$$aN_T = 3 \qquad (19)$$

Equation (22) represents that a is equal to $$a = \frac{3}{2000} = 1.5(10^{-3}) = 0.0015 \qquad (22)$$

Figure 13:
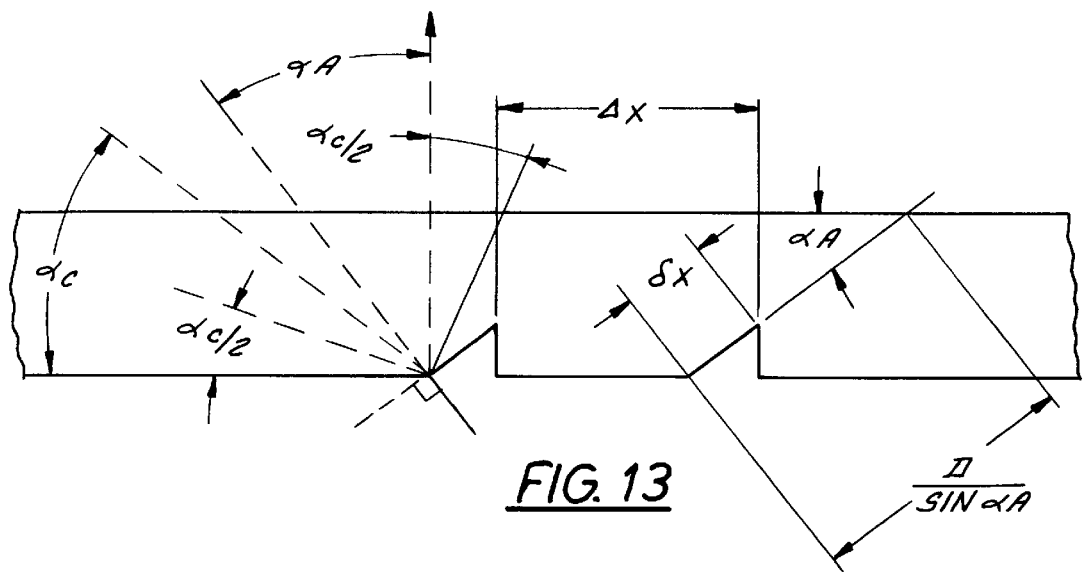
FIG. 13 illustrates a partial sectional view of a collimating waveguide according to the present invention.

The average leakage per groove is thus $1.5 \times 10^{-3}$ as represented in Equation (22). FIG. 13 illustrates calculation of the groove. $\sigma x$ equals the length of a hypotenuse. $\alpha_A$ indicates the angle subtended by the hypotenuse with regard to the base of the waveguide. $\alpha_c$ is the total critical (TIR) angle of the light that is within the waveguide, approximately 40°. FIG. 13 actually represents a worst case scenario for an extended source, assuming that no collimation was done between the source and its entry into the waveguide. In FIG. 13, $\alpha_c$ is the angle between the incident beam on the reflective surface and the reflective beam, $\alpha_c$ being the maximum divergence within the waveguide. The grooves are designed for the midpoint $\alpha_c/2$. Equation (25) represents calculation of $\alpha_A$ based on $\alpha_c$.

$$\alpha_A = \frac{\frac{\pi}{2} - \frac{\alpha_c}{2}}{2} = \frac{\pi - \alpha_c}{4} \qquad (25)$$

Note that the maximum beam divergence can be reduced provided that collimation is achieved as light enters the waveguide due to Snell's law. Nevertheless, $\alpha_A$ represents the optimum angle for splitting the flux represented by $\alpha_c$, or other maximum divergence angle, smaller than $\alpha_c$. The typical index of refraction range for the materials of interest is from 1.5 to 1.7, assuming a refractive index of 1.55. These materials include plastics, such as, for example, acrylics such as polymethacrylate and polymethylmethacrylate and other polymers. Equation (26) assumes that the exterior medium is air having an index of refraction of 1 $\alpha_c/2$ is approximately 40° under these conditions.

$$\alpha_A = \frac{180° - 40°}{4} = 35° \tag{26}$$

Thus, $\alpha_A$ equals approximately 35° based on this calculation as shown in Equation (26). Areas are represented in Equation (28), where a is the loss per groove.

$$\delta x = \frac{aD}{\sin\alpha_A} = aD(1.74) \tag{28}$$

Equation (28) represents that a percentage of the flux passing a point is not going to intercept the hypotenuse, based on the hypotenuse being a fraction of the total subtended length between the top of the waveguide and the bottom of the waveguide. Total length of each groove hypotenuse is $\delta x$, assuming that the wave front of the waveguide is homogenous. It should be noted that skew rays are being neglected. This model is accurate within an order of magnitude. Assuming a width of 3 mm, which is equal to D, refer now to Equation (29) where the width of the hypotenuse is determined as 8 microns.

$$\delta x = \frac{3}{2000} x(3 \text{ mm})(1.74) = 8 \cdot 10^{-3} \text{ mm} = 8 \mu m \tag{29}$$

Figure 14:
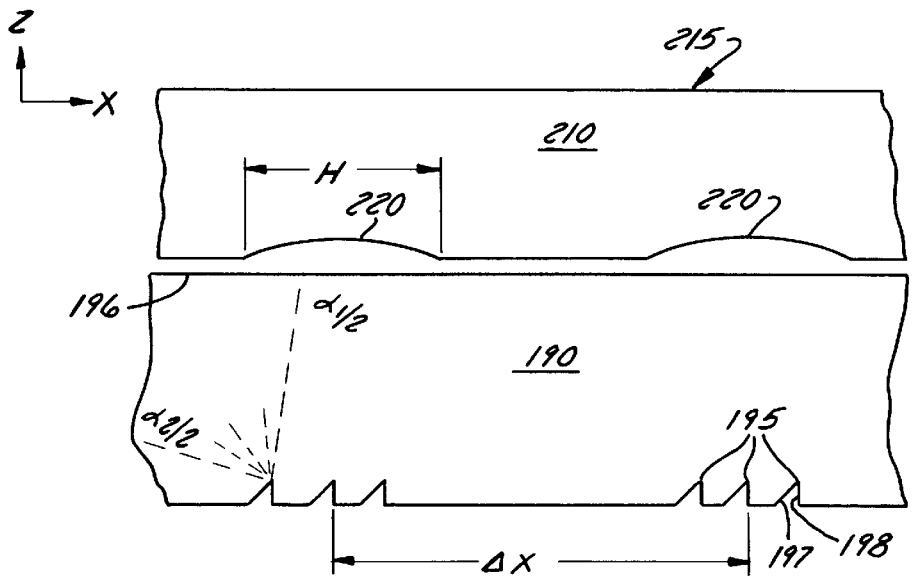
FIG. 14 illustrates a partial sectional view of a liquid crystal display system according to the present invention.

$1/\sin \alpha_A$ is 1.7 for the thickness of 3 mm, the leak per groove represented 3/2000, assuming a mirrored surface on the top. While each groove can be very small, but referring to FIG. 14, the corresponding lens needs to be much larger. FIG. 14 shows an imaging collimation slab located beneath a collimating waveguide. A gap of 1 micron between the two slabs is more than sufficient to prevent undesired coupling between the structures, assuming 100 micron lens for example. The angle incident upon the collimating imaging optic cannot be smaller than $\alpha_c$. Based on the previously assumed groove spacing of 3 mm, the resulting lens diameter is 2 mm, which is far too large. However, the grooves can be arranged in clusters permitting grouping. By grouping the grooves there can be sufficient spacing for the imaging optics. The following example represents an average distance of 2 mm between the clusters of grooves. $N_t$ represents the number of clusters of grooves.

$\Delta x=2$ mm, $L=20$ cm, $N_t=100$, $dx=160$ $\mu m$

The smaller number of grooves is accounted for by a much larger $\delta x$. A $\delta x$ of 160 microns corresponds to 1 microgroove per cluster. Increasing the number of microgrooves per cluster would reduce $\delta x$ proportionally. However, $N_t$ would remain at 100 representing the requirement for 100 clusters of such microgrooves. In the following example, $\Delta x$ is the distance between clusters, and H is the lens diameter, and we assume, approximately, that $H=\Delta x$.

$\Delta x=1$ mm, $L=20$ cm, $N_t=200$

The size of the grooves can be varied much more and their geometrical position can be cruder, therefore the grooves do not need to be prisms because the spherical rays are subsequently image collimated. Errors from the microgroove surfaces can be accommodated with larger imaging optics. In contrast, the prisms of U.S. Pat. Nos. 5,390,276 and 5,359,691 are acting largely as mirrors and if there is distortion due to imperfect structure the result will be divergence that the structure disclosed in these patents will not subsequently correct for.

Figure 9:
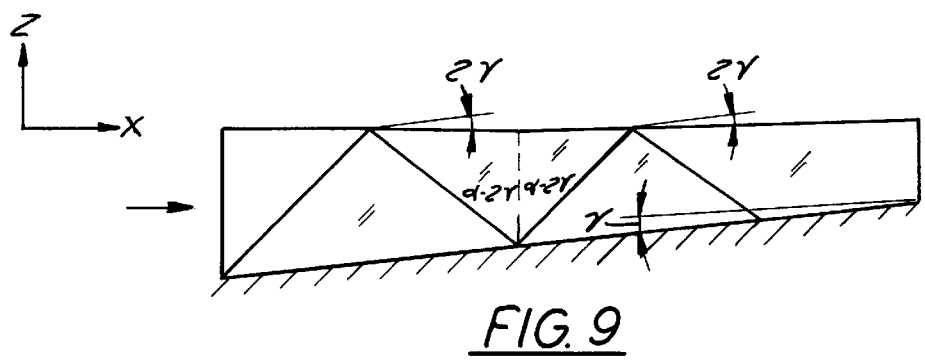
FIG. 9 illustrates a sectional view of a wedge collimating waveguide according to the present invention.

Collimation by a generalized wedge concept will now be described. Referring to FIG. 9, trigonometric relationship of the angle of incidence $\alpha$ within this wedge will cause the angle of incidence to be reduced by $2\gamma$ after each bounce, assuming that $\gamma$ is the wedge angle. Assuming the initial entry angle is approximately 40°, $\alpha$ will equal 50°. This is far larger than the critical angle so the first bounce will be by total internal reflection (TIR). At some point thereafter there will be a bounce where some portion of the ray is leaked. Assuming the wedge angle $\gamma$ is 0.5°, $2\gamma$ is 1°, and in order to approach 40° a minimum of 10 bounces is required, counting only the bounces from the bottom. Equation (49) describes the condition for leakage starting with an incident angle a and a wedge angle $\gamma$.

$$\alpha - N(2\gamma) = \alpha_{cond} \tag{49}$$

The wedge has a sawtooth pattern. These sawtooths represent a distributed wedge. The upper section operates by total internal reflection (TIR) preferably, although the angled facet could be metallized. The determination of the angle in the upper section is based on the same bisectrix that was used to derive the angle of the curved surface. In general it will be appreciated that one facet should be approximately vertical and the other approximately 45° in order to yield a straight-up normal collimated output. A monolithic wedge divided into a series of solitudes can be characterized as a distributed wedge.

Figure 10:
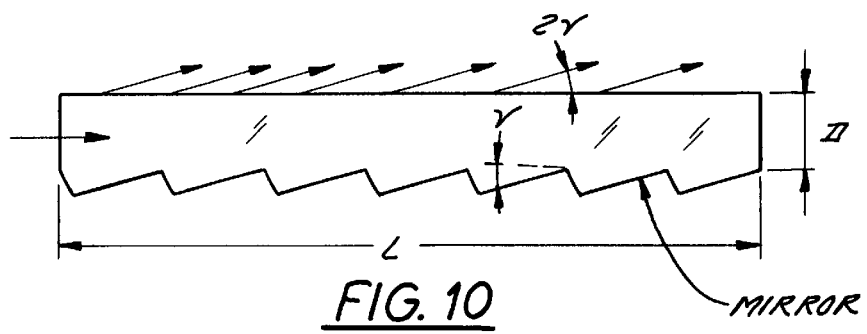
FIG. 10 illustrates a sectional view of a distributed wedge collimating waveguide according to the present invention.

Referring to FIG. 10, a distributed wedge is shown. A distribution of the wedges provides a homogeneous illumination. This concept is similar to Equation (1). This derivation displayed $\rho$ as a function of x holding the variable a constant. In the following derivation, the variable a is a function of x and $\rho$ is constant. Alternatively, if the variable a is constant and $\rho$ is variable, the other derivation can be used. In the following derivation P replaces I. P is the optical power. Equation (101) is the analog of Equation (1), except that the variable a is a function of x and $\rho$ is constant.

$$-dP = a(x)P\rho dx \tag{101}$$

$$\rho = \text{constant} = \frac{dN}{dx} \tag{102}$$

Equation (16) is identical to Equation (101) and Equation (17) sets a boundary condition. Equation (118) sets p x a equal to a constant A.

$$dP = -A\rho dx \tag{118}$$

Equation (123) should be compared to Equation (6).

$$a = \frac{A}{P} = \frac{A}{P_o - A\rho x} \tag{123}$$

It is clear that in Equation (123) a is a function of x whereas in Equation (6) $\rho$ is a function of x. A is a constant in both equations. In Equation (123) a is variable where $\rho$ is constant. The variable a is the leakage rate per microelement.

$$\frac{\Delta P}{P} = 2\gamma \cot\beta \Rightarrow a = \frac{2\gamma \cot\beta}{\Delta N} \tag{126}$$

Full Lambertian dispersion would be $\pi/2$. This can be reduced to $2\beta$, where $\beta$ is the critical angle from the previous interaction, approximately 40°, although it can be smaller assuming that some collimation process has occurred before. It must be calculated what $\gamma$ should be in order to obtain the desired leakage. Intensity is $J = J_o \cos \alpha$. While I is optical intensity and is expressed in units of watts per square meter, for example, radiant intensity, J, is expressed in units of watts per steradian. But in this derivation only the two dimensional case is being considered and J is expressed in watts per radian. Lambert's law is represented by $J=J_o \cos \alpha$. Integration in Equation (110) describes the total power going through the wave guide from $-\beta$ to $+\beta$.

$$Po = 2 \int_0^\beta J d\alpha = 2 \int_0^\beta J_o \cos \alpha d\alpha \tag{110}$$

$\Delta P$ in Equation (113) is the leakage from $2\gamma$.

$$\Delta P = 2\gamma[\sin\beta - \sin(\beta - 2\gamma)] \tag{113}$$

Assuming that $\gamma$ is much less than 1 radian, this $\Delta P$ is used in the following Equation (125):

$$a = -\frac{\frac{\Delta P}{Po}}{\Delta N} - \frac{\frac{\Delta P}{Po}}{\Delta N} \tag{125}$$

Equation (126) describes relative leakage for each event. In the distributed wedge the relative leakage per event is proportional to $\gamma$ and fitting Equation (123) into Equation (126) yields Equation (128).

$$\frac{2\gamma \cot\alpha\beta}{\Delta N} = \frac{A}{P_o - A\rho x} \tag{128}$$

In Equation (128), $\gamma$ is changing with x according to the relationship shown in Equation (132).

$$2\gamma(x) = \frac{A \Delta N}{(P_o - A\rho x)\cot\alpha\beta} \tag{132}$$

As $\gamma$ increases with x to provide constant leakage, it is enabled to regulate $\gamma$. Alternatively, $\rho$ can be varied as was previously shown. Assuming density is constant at 10 per millimeter, $\rho$ is constant as shown in Equation (136), $$\rho = \frac{dN}{dx} = \frac{10}{mm} \tag{136}$$

Assuming a total length L of 20 cm, Equation (137) shows that the leak per grove is small.

$$a_o = \frac{1}{200mm \cdot 10mm^{-n}} = \frac{1}{2000} \tag{137}$$

Equation (140) shows that the beginning angle only needs to be 1/10th of a degree.

$$2\gamma_c = 2 \cdot 10^{-3} = 0.1° \tag{140}$$

Again, the assumptions are ignoring skew rays. Illustrating skew rays would only be possible with the fall ray tracing scheme program. It would be advantageous in order to accommodate skew rays to modify the orthogonal shapes to cylindrical symmetric shapes. This would involve repeating a cross section rotated around a vertical axis. Rotation can also be based on an ellipse as opposed to a circle. In a (z,x) cross section, the triangles are representing prisms, however, when considered along the (x,y) plane for the combination of skew rays, such triangular sections may actually become cones or more complex elliptical shapes in order to accommodate the skew rays. Such a topology would be complex.

Figure 19:
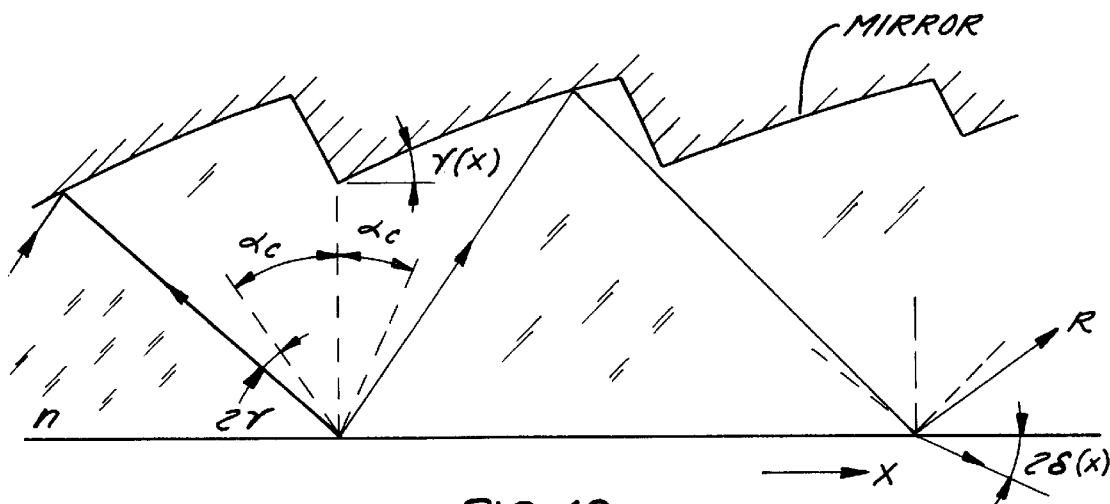
FIG. 19 illustrates a partial sectional view of a collimating waveguide according to the present invention.

A more precise version of Equation (128) follows, including a consideration of fresnel reflection, (represented by reflection (intensity coefficient) R as graphically depicted in FIG. 19), and material absorption. The power p in Equation (128) is replaced by Equation (300):

$$P \to P(1-R-D) \tag{300}$$

Where R is Fresnel reflection coefficient, and D is absorption coefficient. Therefore, Equation (116) becomes:

$$-dP = a(x)P(x)[\Delta - R(x) - D]\rho dx \tag{301}$$

Where D-coefficient is assumed to be constant, as well as $\rho$-coefficient. In order to preserve beam leak uniformity, the following Equation (302) should be satisfied:

$$a(x)P(x)[\Delta - R(x) - D] = const. = A' \tag{302}$$

Where A' is a new constant, analogous to the constant A. Using the same reasoning as above, the following Equation (303) is obtained for a-coefficient.

$$a(x) = \frac{A'}{(P_o - A'\rho x)[1 - R(x) - D]} = 2\delta(x)\cot\alpha\beta \tag{303}$$

Equation (303) is identical to Equation (128), assuming R=D=0, and using the $\alpha$-angle symbol instead of $\delta$-angle. For $\delta<<1$, and $\alpha<<1$, the relation between $\delta$ and $\gamma$ is $$\delta^2 \approx \gamma \sqrt{n^2 - 1} \tag{304}$$

Where Snell's law has been included. $\delta$ is the leakage angle and $\gamma$ is the prism angle. This is shown in Table 1.

TABLE 1

| LEAKAGE ANGLE $2\delta$ VERSUS WEDGE ANGLE $\gamma$ FOR n = 1.55, | | | | |
|---|---|---|---|---|
| $\gamma$ | 0.5° | 1° | 1.5° | 2° |
| $2\delta$ | 11.6° | 17.5° | 21° | 24.5° |

Table 1 illustrates that even for small $\gamma$-angles, $\delta$-angles can be quite large. For angles, close to critical angle $\alpha_c$ (sin $\alpha_c = \Delta/n$), the Fresnel reflection coefficients can be quite high. For example, for $\gamma=0.2°$, we obtain R=51%, while for $\gamma=0.5°$, R=30%.

As an example, an approximate solution of transcendental Equation (303) follows. Since R-coefficient depends on $\delta$, Equation (303) is a transcendental one in such a sense that it cannot be solved analytically. In order to solve Equation (303) approximately, it is assumed, in the first iteration step, that an $\alpha_L$-value (i.e., $\gamma$-value, for x=L) equals 0.5°, which leads to the Fresnel reflection coefficient value: R=30%. It is further assumed that at the end of the waveguide, 5% of light power remains; i.e., P(L)=0.05$P_o$. An absorption coefficient value (conservative) of 2% is also assumed. Then, for n=1.55, and $\alpha_c=40°$, $\alpha_L=0.74°$. It will be appreciated that the first iteration step worked relatively well. Using Equation (304), $\delta=7°$ is obtained. Thus, the leakage angle (in the air) of $2\delta$ is equal to 14°. Of course, for x=0, the values of angles $\gamma$ and $\delta$ (i.e., $\gamma_o$ and $\delta_o$-values) will be much smaller. Therefore, in this case, the $\gamma$-distribution is non-uniform. This numerical example demonstrates how to design the distributed wedge system. Its exemplary parameters have been summarized in Table 2.

TABLE 2

SUMMARY OF EXEMPLARY PARAMETERS OF THE DISTRIBUTED WEDGE SYSTEM

| # | PARAMETER | SYMBOL | VALUE |
|---|---|---|---|
| 1 | LENGTH | L | 20 cm |
| 2 | TOOTH DENSITY | σ | 10/mm |
| 3 | WEDGE REFRACTIVE INDEX | n | 1.55 |

TABLE 2-continued

SUMMARY OF EXEMPLARY PARAMETERS OF THE
DISTRIBUTED WEDGE SYSTEM

| # | PARAMETER | SYMBOL | VALUE |
|---|---|---|---|
| 4 | WAVEGUIDE THICKNESS | D | 3 mm |
| 5 | POWER FRACTION AT THE END | $P_L/P_o$ | 0.05 |
| 6 | WEDGE ANGLE AT x = L | $\gamma_L$ | 0.74° |
| 7 | MAXIMUM LEAKAGE ANGLE AT x = L | $2\delta_L$ | 14° |

Curved Facet Surfaces

Different parts of the surface of each facet are available to different rays coining from different directions. Therefore, a flat surface facet is not always optimum because the available light is not ideally distributed.

Figure 16:
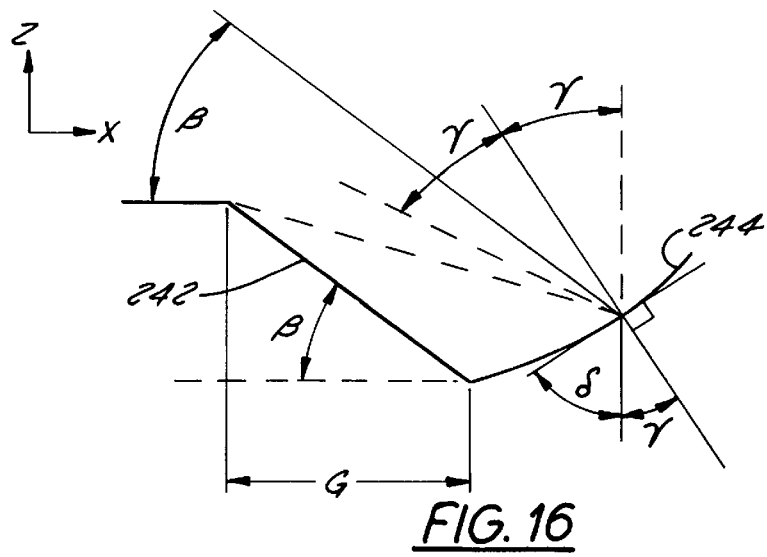
FIG. 16 illustrates a schematic sectional view of a portion of the collimating waveguide shown in FIG. 15.

By ignoring skew rays, an optimized curved surface can be easily designed by assuming homogenous incident flux. For example, the bottom of an isosceles pit pyramid is not available to a low incident angle ray. It is desirable to optimize the design of the facet so as to weight the intensity of the flux cones that are available to any given surface of the reflection. For example, constructing an arc instead of a flattened prismatic surface reflecting rays coming from the left requires defining the maximum and minimum angles for those rays which can strike any part of the arc based on the geometry of the waveguide. More specifically, at the top of the arc waves cannot arrive at angles lower than 0° because they would be intercepted by the previous apex. In contrast, at the bottom of the arc waves can arrive at a wider range of angles. Referring to FIG. 16, bisecting the center of both of these angles will result in a simple geometric definition of the tangent of the curve. However, the flux weighted center point of each of these two angles will be slightly different from the geometric bisectrix because the waveguide is not homogeneously illuminated from the light source due the light source itself generating a nonplanar, albeit somewhat symmetric, flux distribution.

The curved tooth facet is mirrored and can be referred to as a vignetting effect where there is a limited size and some parts of the beam are blocked by structures. The first facet can be flat. Although it's shown as flat to facilitate analysis of the lowest-most ray, the facet can actually be convex or concave. At the base of the apex, the angular spectrum is very limited. The widest angular spectra is at the top, based on the incoming rays. The coordinate system labeled has its origin at the base of the structure. The problem is to find z as a function of x for the curved surface.

Figure 20:
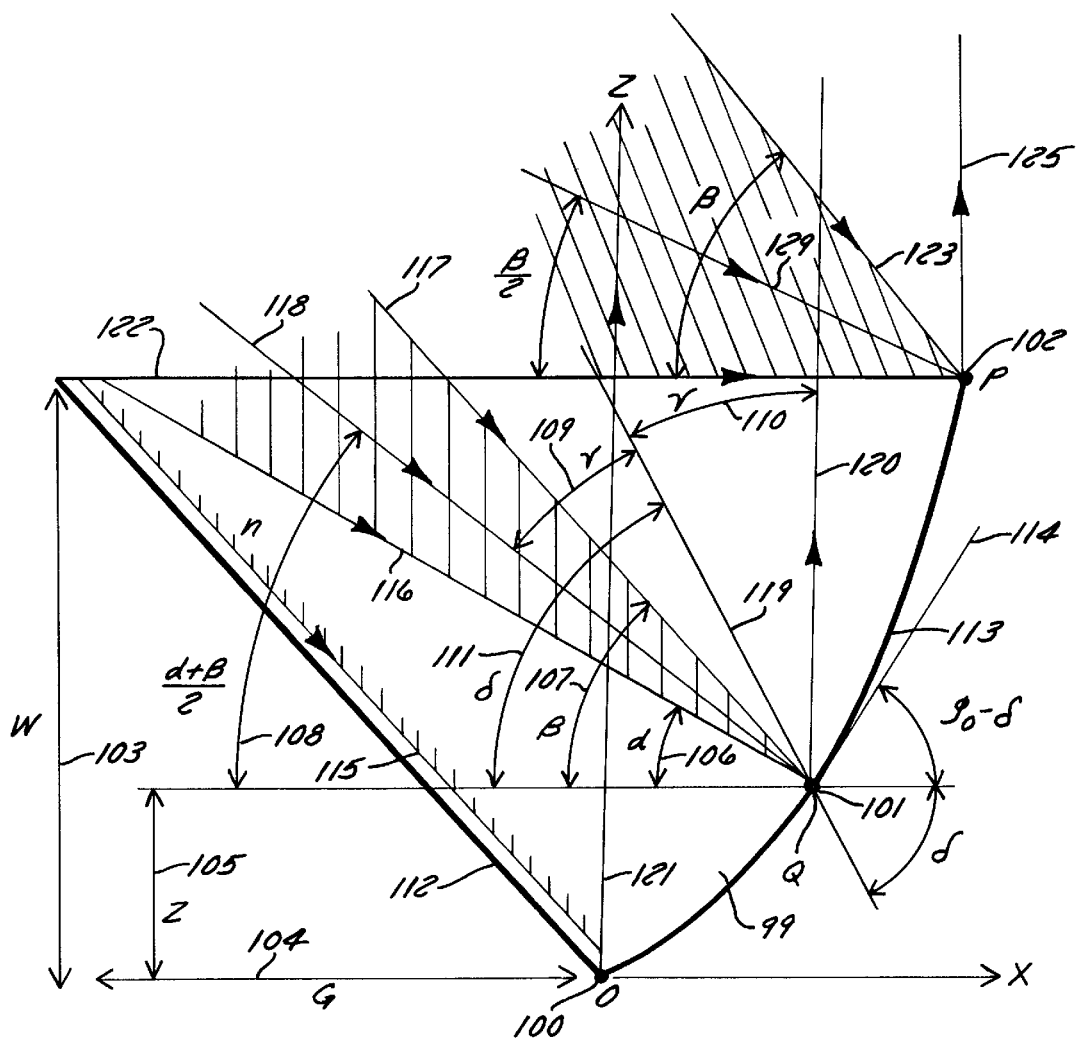
FIG. 20 illustrates a geometrical construction of a portion of a collimating waveguide according to the present invention.

Referring to FIG. 20, the sawtooth geometry, with curved surface 113 is described, leading to the optimum curved surface z(x). This is a curved surface rather than a flat surface because the incident beams at points O, Q, P in FIG. 20, have increasing divergence as illustrated by the hatched areas in FIG. 20.

A description of FIG. 20 follows. FIG. 20 shows tooth 99. The vertex 100 of the nonimaging optic(s) (NIO) tooth is O and is positioned following beam collimation optimization according to the Louiville theorem as generally explained by Wilford[1] and Winston[2].

Arbitrary point Q 101 is located on the curve: z=z(x), that should be optimized. Of course, arbitrary point Q 101 has two coordinates (x,z). The highest point 102 on the curved wall is P. The height of the tooth 103 is taken between P and O. The horizontal length of the straight wall is represented by 104. The z-coordinate of point Q is represented by 105. Point Q is also origin of the coordinate system.

The lowest angle ($\alpha$) of incident nays at point Q is represented by 106. The highest angle ($\beta$) of incident rays at point Q is represented by 107. This is also the maximum angle of beam divergence. As a result of total internal reflection (TIR) inside collimating waveguide, the maximum value of angle $\beta$ is: ARC TAN (1/n), where n is reflective index of the tooth which is surrounded by air. For n=1.55, $\beta \approx 40°$.

A bisect angle, equal to $$\frac{\alpha + \beta}{2},$$

is represented by 108. The incident angle ($\alpha$) of bisect ray, which is a central ray for the beam (or, ray bundle) approaching point Q, is represented by angle 109. Angle 110 is the reflection angle of bisect ray and is equal to angle 109. 111 represents the symmetrical angle ($\delta$) for bisect rays. It should be noted that symmetrical line 119 is perpendicular to tangential line 114. Therefore, the tangential angle is 90°–$\delta$ (or, $\pi/2-\delta$).

112 is a straight line (or, wall in cylindrical geometry) of the tooth. 113 is the tooth curve that characterizes the optimum NIO profile, minimizing divergence of the output beam. This is because, by contrast to the prism, the ray-bundle at any point at the surface is reflected symmetrically into vertical direction. This is due to the fact that the bisect line of any ray bundle is reflected exactly vertically.

114 is the tangential line into the curve at point Q. 115 is the incident ray at point O. This is the maximum divergence ray. 116 is the lowest inclination ray for the ray bundle at point Q. 117 is the highest inclination ray at point Q. 118 is the bisect ray for the ray bundle at point Q. 119 is the symmetrical line to bisect incident ray 118 and bisect reflected ray 120, which is precisely perpendicular to tangential line 119.

120 is the reflected ray into incident bisect ray 118 which is precisely vertical, or parallel to z-axis. 121 is the reflected ray to incident ray 115 which is also precisely vertical, according to the optimization principle. 122 is the lowest inclination incident at highest Point P, which has a horizontal direction. 123 is the highest inclination which is assumed to be $\beta$, in order to accommodate the maximum amount of rays. 124 is the bisect ray at point P. 125 is the reflected ray to bisect ray 114 which is always precisely vertical, according to the optimization principle.

An analytical procedure for defining the optimized curve z =z(x) follows. According to FIG. 20, the angle 111, or $\delta$, is $$\delta = \frac{\pi}{4} + \frac{\alpha + \beta}{4} \tag{200}$$

Where $\alpha$ is angle 106 and $\beta$ is angle 107. It should be noted, that, while according to the optimization principle, $\beta$-angle is constant, for any point Q at the curve, $\alpha$-angle is defined as follows:

$$\tan\alpha = \frac{w - z}{G}$$

i.e., $\alpha$ is a function of z-coordinate. Thus, the $\delta$-angle is also a function of z. Therefore, line 113 is not straight but curved, according to the optimization principle; and $$\delta(z) = \frac{\pi}{4} + \frac{\beta + \alpha(z)}{4} \tag{202}$$

where $$\alpha(z) = \arctan\left(\frac{w-z}{G}\right) \quad (203)$$

The basic differential equation defining the optimization principle is $$\frac{dz}{dx} = \tan(90° - \delta) = \frac{1}{\tan\delta} \quad (204)$$

or, $$dx = dz\tan\delta \quad (205)$$

Where dx and dz are infinitesimal changes or coordinates (x,z), at point Q of the curve using Equations (202), (203), (204) and (205), we obtain, $$dx = dz\tan\left[\frac{\pi+\beta}{4} + \frac{1}{4}\arctan\left(\frac{w-z}{G}\right)\right] \quad (206)$$

and the solution of the problem, is $$x(z) = \int_o^z \tan\left[\frac{\pi+\beta}{4} + \frac{1}{4}\arctan\left(\frac{w-z'}{G}\right)\right] dz' \quad (207)$$

Typically, the solution is presented in the inverse form to Equation (207):

$$z = z(x), \tan\beta = \frac{W}{G} \quad (208)$$

The Equation (208) can be numerically calculated for various values of G and angles β. A calculation and illustration for two-cases of curve z(x), where x(z) is determined by Equation (207) as shown in FIG. 21 follow.

Figure 21:
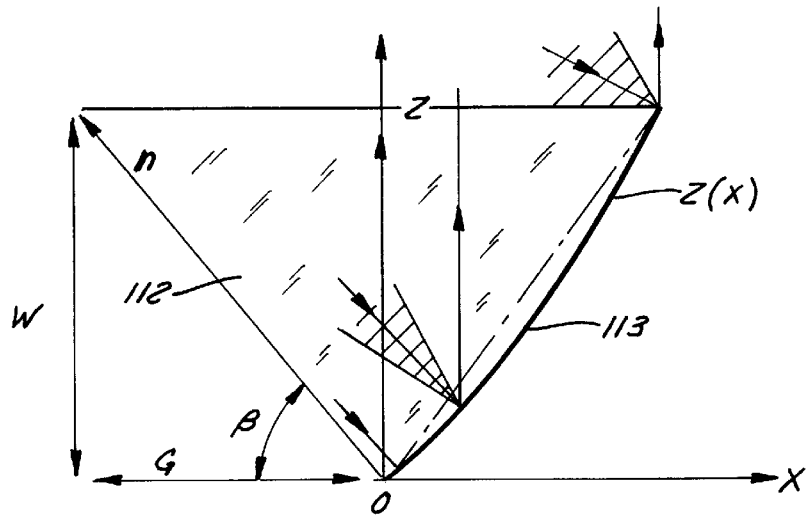
FIG. 21 illustrates a geometrical construction of a portion of a collimating waveguide according to the present invention.
Figure 24:
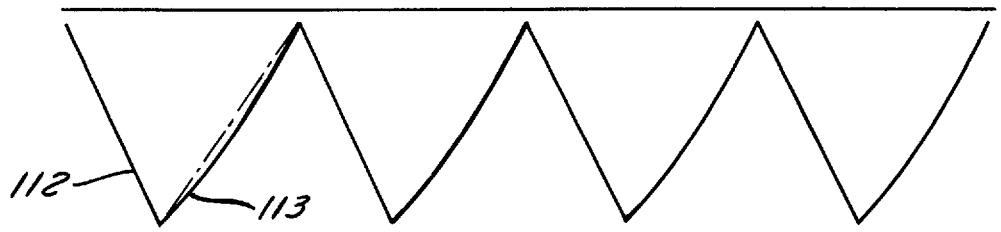
FIG. 24 illustrates a portion of a collimating waveguide according to the present invention.
Figure 25:
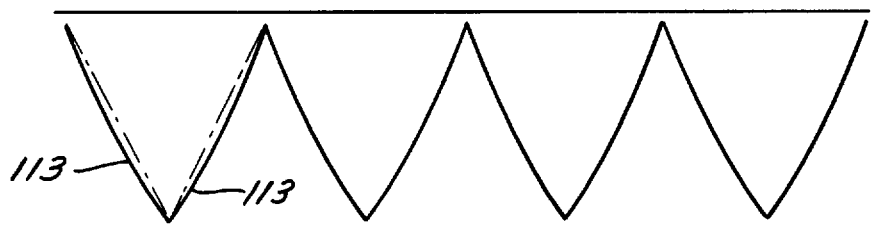
FIG. 25 illustrates a portion of a collimating waveguide according to the present invention.

FIG. 21 shows a multiplication of the optical element shown in FIG. 20 for unidirectional illumination. FIG. 25 is a generalization of FIG. 24 for bi-directional illumination.

Figure 22:
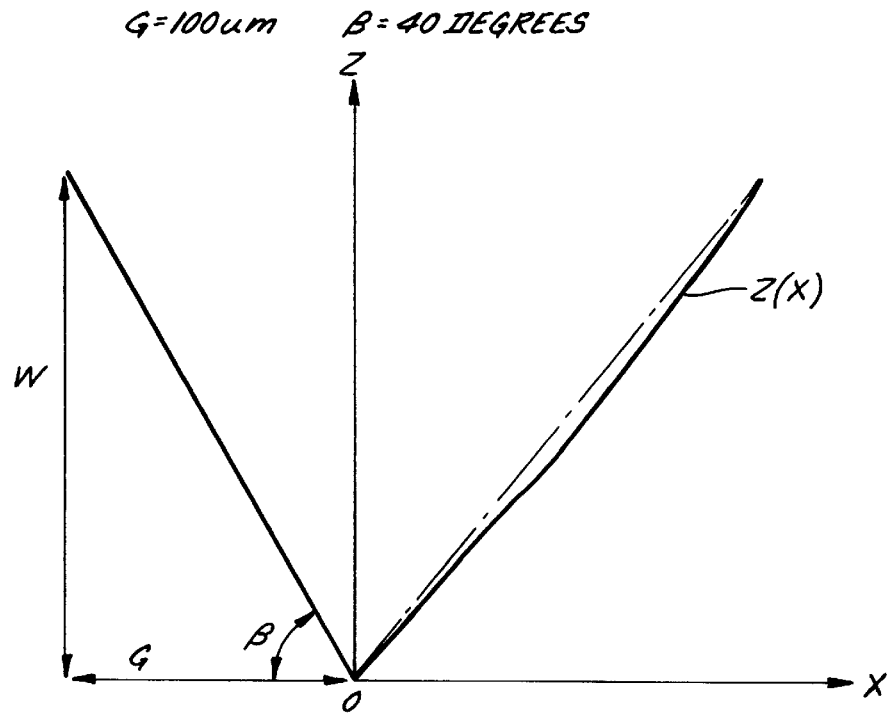
FIG. 22 illustrates a geometrical construction of a portion of a collimating waveguide according to the present invention.
Figure 23:
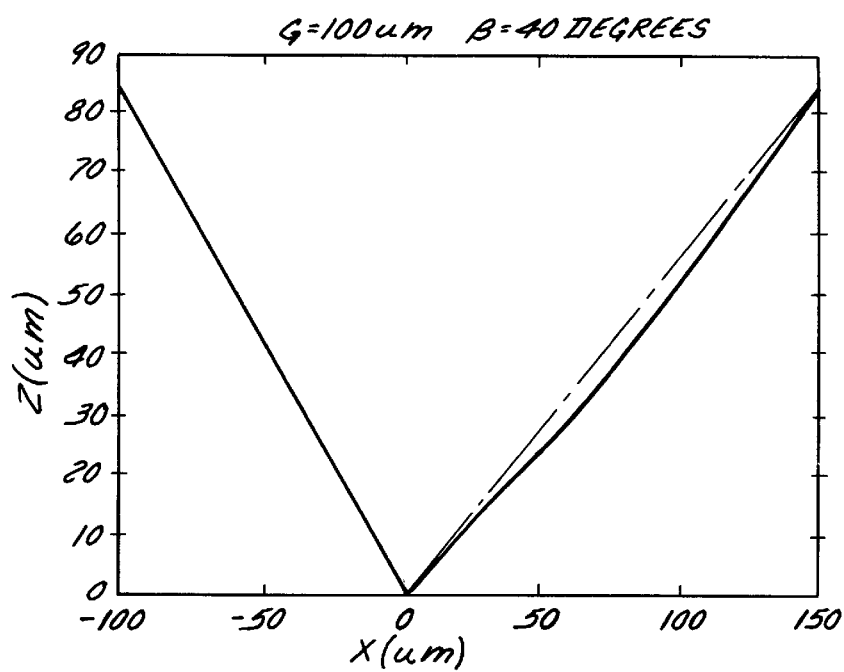
FIG. 23 illustrates a portion of a collimating waveguide according to the present invention.
Figure 26:
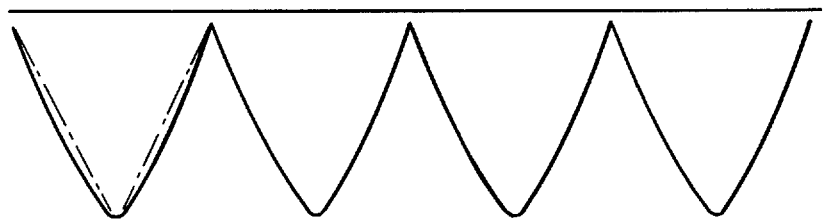
FIG. 26 illustrates a portion of a collimating waveguide according to the present invention.

Referring to FIG. 22, a calculation and illustration of the sawtooth design for the case: G=100 μm,β=40° is shown. We see that the surface 113 is indeed curved. The single sawtooth element from FIG. 22 has been illustrated in detail in FIG. 23 and multiplied in FIG. 24 in order to show a practical sawtooth applied to one side of the collimating waveguide as in FIG. 15. In order to apply two sources from both sides of the waveguide, the curved surface 113 has been applied on both sides in FIG. 25. It should be noted that skew rays have not been considered in this analysis, for simplicity. In FIG. 26, the structure from FIG. 25 is depicted with smooth lower vertices, in order to minimize the scattering at the edges.

The shape of the curve in the vignetting effect curved tooth is a function not only of the geometry of the chasm defined by the first facet and the second facet of each optical element but also the output of the light engine. Thus, it is useful to consider the flux dispersion of the light engine and the flux dispersion within the collimating waveguide.

Fabrication of Collimating Waveguide

Conveniently, the collimating waveguides of the present invention can be carried out by using any fabrication method. For the manufacturing operation, it is moreover an advantage to employ a replication/lamination method.

Isosceles triangles can be cut when fabricating the master for replicating the collimating waveguide provided that there is no undercutting. Any undercutting inhibits mold release. There is a general degradation as you move from the master to the submaster to the finished part. Degradation removes the edges. Much of this degradation is due to the forces exerted during release. Thus, the shape on the master is not necessarily the finished facet structure. Although the facets themselves tend to become convex due to the release process, concave shapes are possible to make. Further, it is relatively easy to combine two facets to define a compound concave structure.

To fabricate the master for the above-discussed assemblies of optical elements, a metal master can be machined with diamond tooling. Machining flat facet microgrooves with cylindrically variable angles is possible. A spherical or aspheric curve can be cut on a diamond and the resulting curved optical microelement could be as small as 50 microns. Variable angles are possible with curved facets as well. Variable spacing is possible with both flat facets and curved facets. In addition, imaging microlenses can be cut as small as 200 microns. However, the diamond tooling wears-out so it is advantageous to fabricate one master and then replicate a series of submasters.

Liquid Crystal Displays

Liquid crystal displays can be high definition and/or low definition. The number of pixels can be, for example, 2000×2000. Presently the smallest size pixel resolution is approximately 20 microns. These LCDs produce undesirable pixeling effect. Viewers can actually see these pixel demarcations.

Diffusers

An important function that can be carried out by a diffuser located between the collimating waveguide and the LCD is to cancel pixeling effect from the LCD. Such a use of a diffuser can be termed homogenizing.

In addition, the directionality of the light emitted from the LCD can be optimized through the use of a diffuser with directional characteristics located on top of the LCD. This would allow a private limited viewing range from a laptop computer. Directional diffusers are non-Lambertian diffusers, optical properties of which are defined by plane-wave response as discussed in U.S. Pat. No. 5,365,354. It can be assumed that the incident waves are not fully collimated but have divergence of perhaps ±10°. Of course, the divergence from the diffuser cannot be less than the divergence that is reaching it. Typical values would be from approximately 1–40° half angle. As a practical matter, if the incident divergence is approximately 20° and the divergence of the diffuser is approximately 1° then the output would be approximately the same as the input with regard to divergence. Diffusers do not help in collimation. However, diffusers most definitely help in homogenization. Specifically, such diffusers can obviate pixeling from the LCD.

A diffuser can be located between the groove structure and the LCD structure and/or a diffuser can be located after the LCD. In the former case, the diffuser will homogenize only the grid structure and not the pixels. In the latter case the diffuser would be homogenizing both structures.

Diffuser Fabrication

Methods for making the light shaping holographic surface relief diffusers of the present invention are now described. Generally, the first step is to create a master diffuser, the second step is to record in a photosensitive medium with coherent light passed through the master diffuser, and the third step is to replicate the surface structure of the photosensitive medium with, for example, epoxy. A fourth and optional step is to make a metal electroform master from the epoxy for mass production purposes. In the alternative, an electroform master may be made directly from the master diffuser.

Figure 18:
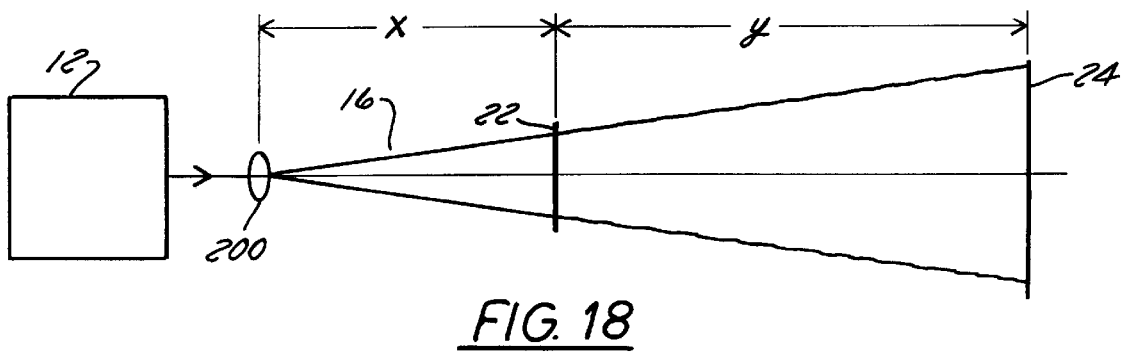
FIG. 18 illustrates a schematic view of a recording configuration for making diffusers according to the present invention.

Referring to FIG. 18, a recording set-up 16 is shown comprising a coherent laser light source 18, objective lens 200, master diffuser 22, and photosensitive medium 24. Coherent laser light source 18 is standard. The objective lens 200 is standard and may be a low or high magnification lens depending upon the desired characteristics of the photosensitive medium 24. The objective lens is spaced a distance X from the master diffuser 22. The master diffuser 22 may comprise a standard ground glass diffuser, a lenticular diffuser, an acetate diffuser, or a holographic diffuser. The ground glass, lenticular, and acetate diffusers are conventional and made in a conventional manner. If a holographic master diffuser is desired to be used, that master diffuser may itself first be recorded in the recording set-up shown in FIG. 18 with the holographic master diffuser to be recorded being positioned at 24 and a conventional ground glass diffuser being located at 22. That master diffuser may then be used to record into another photosensitive medium to be used as a light shaping holographic surface relief diffuser according to the present invention.

A related set-up for recording volume holographic diffusers is described in U.S. Pat. No. 5,365,354. According to that disclosure, recording a holographic plate with coherent laser light passed through a conventional ground glass diffuser generates features called speckle in the volume of the hologram. The size, shape, and orientation of the speckle can be adjusted which in turn affects the angular spread of light scattered from the holographic diffuser upon playback. Generally, the size of the angular spread of the scattered light, in other words, the angular distribution of the scattered light, depends on the average size and shape of the speckle. If the speckle are small, angular distribution will be broad. If the speckle size is horizontally elliptical, the shape of the angular distribution will be vertically elliptical. Thus, it is desirable to control the size and shape of speckle recorded in the medium so that, upon playback, the correct output or angular spread is produced.

Speckle size is inversely proportional to the size of the aperture of the master diffuser. If the size of the aperture increases, the size of the speckle decreases and the size of the angular spread of the scattered light from the recorded photosensitive medium increases. Conversely, if the size of the master diffuser aperture decreases, the size of the speckle recorded in the diffuser increases and the angular spread of light scattered from the recorded photosensitive medium decreases. Thus, if the master diffuser aperture is long and narrow, the speckle will be long and narrow as well with their axes oriented perpendicularly to the axis of the aperture. This holds true for both volume holographic recording media as well as surface holographic recording media.

Diffusers made from volume holographic recording media as in U.S. Pat. No. 5,365,354, however, are disclosed there for their volume effect. In other words, the speckle recorded in the interior or volume of the medium was thought the only desired effect to be obtained from the material. However, since then we have discovered that recording a volume holographic angular spread such as DCG (dichromated gelatin) in a similar recording set-up produces a surface effect of peaks and valleys which may be replicated as described below.

The size, shape, and orientation of the surface features recorded in photosensitive medium 24 is a function of a number of variables including the type of objective lens 200 and master diffuser 22 used, as well as the relative positioning of those components with respect to each other and with respect to the photosensitive medium 24. Ultimately, the desired results are obtained through empirical testing. In order to achieve a recorded photosensitive medium having a particular surface structure that can be replicated and comprise a light shaping holographic surface relief diffuser according to the present invention, it may be necessary to adjust the parameters discussed below to achieve the desired shape of the light output.

The objective lens 200 expands the coherent laser light source 18 so that the area of incidence (or "apparent aperture") of light from the objective lens 200 on the master diffuser 22 is larger than that of the cross section of the laser beam itself. The light beam expands in accordance with the magnification of the objective lens 200.

Consequently, if a small magnification objective lens is used, such as 5×, the aperture of light incident the master diffuser 22 will be smaller than with a large magnification objective lens, such as 60× or greater, and therefore the size of the surface features recorded in the photosensitive medium 24 will be larger; the size of the aperture of light incident the master diffuser 22 is inversely related to the size of the surface features recorded in the photosensitive medium 24.

The distance between the objective lens 200 and the master diffuser 22 must also be taken into account in achieving the desired sculpted surface structure recorded in the photosensitive medium 24. As the distance between the objective lens 200 and the master diffuser 22 decreases, i.e., as X decreases, the size of the speckle increases. This occurs because as the objective lens 200 moves closer to the master diffuser 22, the apparent aperture of light incident the master diffuser 22 is smaller. Because the size of the speckle recorded in the photosensitive medium 24 is inversely related to the size of the apparent aperture on the master diffuser 22, the speckle will be larger. In turn, the increased speckle size recorded in the photosensitive medium 24 will result in a light shaping holographic surface relief diffuser which has decreased diffusion.

Conversely, if the distance X is increased, the apparent aperture of light incident the master diffuser 22 will increase, thus decreasing the size of the speckle recorded in the photosensitive medium 24 and in turn increasing the amount of angular spread of the light shaping holographic surface relief diffuser.

The distance Y between the master diffuser 22 and the photosensitive medium 24 also affects speckle size. As the distance Y decreases, the size of the speckle recorded in the photosensitive medium 24 decreases as well. This occurs because, assuming an expanded beam of light is produced at objective lens 200, as the photosensitive medium 24 is moved closer to the master diffuser 22, the light beam emanating from each of the irregularities in the master diffuser 22 will expand less by the time it reaches the photosensitive medium 24, thus producing smaller speckle. Conversely, if the distance Y is increased, the size of the speckle recorded will be increased. Thus, these simple relationships between the distances X, Y, and the magnification of the objective lens 200, are all adjusted, empirically, to achieve the size of speckle desired in the photosensitive medium 24.

Predefined output areas that are "off-axis" with respect to the normal axis of the diffuser are achieved by tilting the photosensitive medium 24 around an axis normal to its surface. For example, a 20° off axis diffuser may be achieved by fitting the photosensitive medium 24 roughly 20°.

Assuming that a ground glass diffuser is used as the master diffuser 22, the shape of the speckle recorded in photosensitive medium 24 will be roughly round as will the shape of the angular output of a light shaping holographic surface relief diffuser made from photosensitive medium 24. A round output may also be achieved when a lenticular or an acetate sheet is used as a master diffuser 22. Lenticular sheets have tiny lens-like elements machined in them. Acetate diffusers are made by an extrusion and embossing process which also yields roughly round speckle. It is difficult to create or control the desired irregularities in acetate diffusers. With respect to lenticular diffusers, the surface effects necessary to achieve varying output shapes are complex machined macroscopic structures. If a prerecorded holographic master diffuser is used as the master diffuser 22, additional degrees of recording freedom are achieved because the master diffuser can be prerecorded with speckle having virtually any shape, size, and orientation as discussed further below. Speckle characteristics are more easily controlled using a holographic master diffuser.

In any case, in the recording set-up in FIG. 18, the master diffuser must be able to transmit light so that it reaches the photosensitive medium 24 from the objective lens 200. Thus, if a substrate is needed as part of the master diffuser 22, such as if a holographic master diffuser is used, the substrate should be capable of efficiently transmitting light. A glass substrate is preferable. In addition to the additional degrees of freedom which can be achieved by using a prerecorded volume or surface hologram as the master diffuser 22, holographic master diffusers are preferable because better uniformity of intensity in the photosensitive medium 24 is achieved, higher transmission efficiency through the master diffuser 22 is achieved, and the holographic master diffuser 22 causes less back scatter than a ground glass diffuser. A first generation holographic volume master diffuser may be made using a ground glass or acetate diffuser. This holographic diffuser can then be used to make a second generation holographic master diffuser, either volume or surface with greater control.

3. DESCRIPTION OF SPECIFIC EMBODIMENTS

Referring to FIG. 5, light source 60 is located within space defined by mirror 70. Light source 60 can be a cold cathode fluorescent bulb or a hot cathode fluorescent bulb. Light from light source 60 is directed toward waveguide collimator 80. Light source 60 is connected to mirror 70 through fixture 90.

Light source 60 can be more generally referred to as an illumination source. Waveguide collimator 80 includes incident end 130. The bottom of waveguide collimator 80 is provided with a first plurality of substantially parallel optical elements 140. Each of the first plurality of substantially parallel optical elements 140 includes a first facet 142 and a second facet 144. Waveguide collimator 80 includes a top surface 146. Waveguide collimator 80 can also include a reflective end (not shown).

Figure 6:
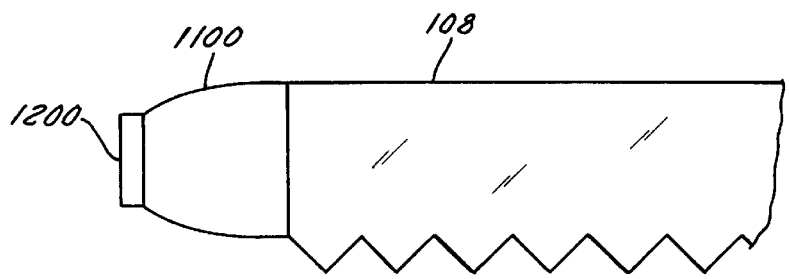
FIG. 6 illustrates a partial sectional view of another liquid crystal display backlight according to the present invention.

Referring to FIG. 6, light engine 1100 is connected to waveguide collimator assembly 108. Light source 1200 is a linear array of light emitting diodes connected to a metallized mirror that is part of light engine 1100.

With regard to the examples shown in FIGS. 5 and 6, and the other embodiments, light from the illumination source can be directly incident upon the incident end. This means that there is no structure between the illumination source and the incident end. For example, the space between the illumination source and the incident end should be occupied by air, or vacuum. By the absence of any structure between the illumination source and the incident end, a higher degree of collimation is achieved when light passes through the incident end in accordance with Snell's law.

Figure 11:
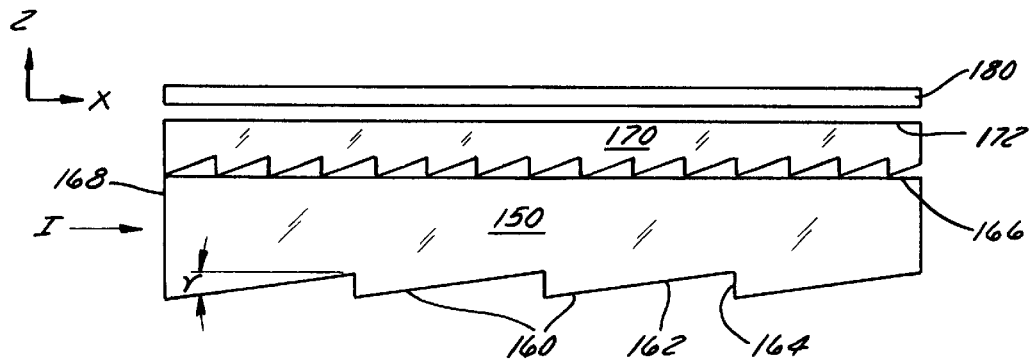
FIG. 11 illustrates an elevational view of a portion of a liquid crystal display system according to the present invention.

Referring to FIG. 11, first distributed wedge collimating waveguide 150 includes a first plurality of substantially parallel optical elements 160. Each of this first plurality of substantially parallel optical elements 160 includes a first facet 162 that can be substantially flat and a second facet 164 that can be substantially flat. First distributed wedge collimating waveguide 150 also includes top surface 166. The angle γ which is defined as the angle that the first facet 162 makes with the top surface 166 should be optimized. Second distributed collimating waveguide 170 is optically connected to first distributed wedge collimating waveguide 150. Second distributed wedge collimating waveguide 170 includes upper surface 172. First diffuser 180 for homogenizing light from upper surface 172 is optically connected to second distributed wedge collimating waveguide 170.

An additional collimating waveguide including a plurality of imaging optics can be located between first diffuser 180 and second distributed wedge collimating waveguide 170. In addition, a diffuser can be located adjacent incident end 168.

Figure 12:
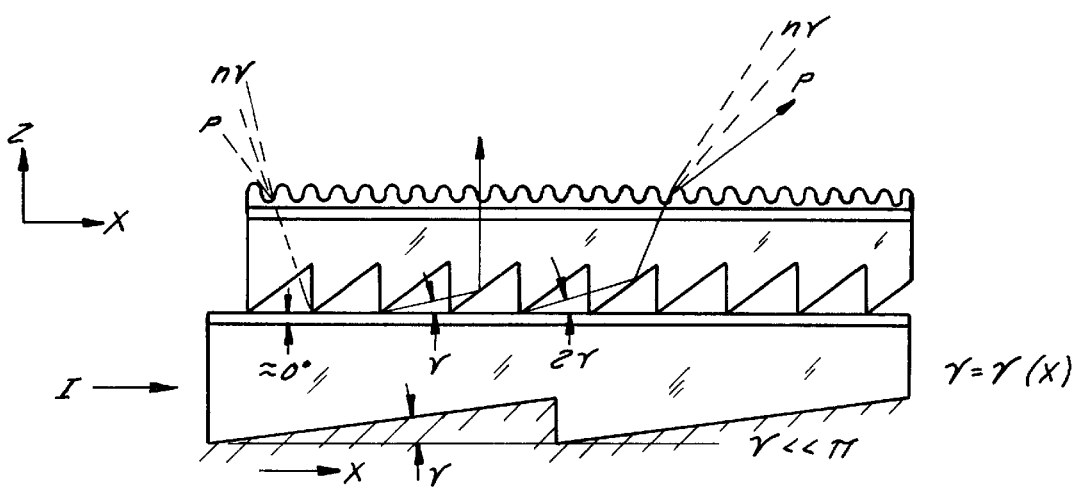
FIG. 12 illustrates a partial sectional view of a portion of the liquid crystal display system shown in FIG. 11.

FIG. 12 shows a ray diagram for the apparatus depicted in FIG. 11. At the left of FIG. 12, a ray is leaked at near zero degree angle to the top surface. It will be appreciated that this ray is emitted from the top of the diffuser toward the left. In the middle of FIG. 12, a ray is emitted from the top surface at an angle γ. This ray emerges normal to the plane defined by the diffuser. Toward the right of FIG. 12, a ray emerges from the top surface at an angle to γ. It will be appreciated that this ray is emitted from the diffuser toward the right.

Referring to FIG. 14, first collimating waveguide 190 is provided with a first plurality of substantially parallel optical elements 195. Each of the first plurality of substantially parallel optical elements 195 includes a mirrored first facet 197 and a second facet 198. First collimating waveguide includes a top surface 196 and an incident end (not shown). Second collimating waveguide 210 is optically connected to the top surface 196. Second collimating waveguide 210 is provided with a plurality of substantially parallel imaging optics 220. Second collimating waveguide 210 includes upper surface 215.

Figure 15:
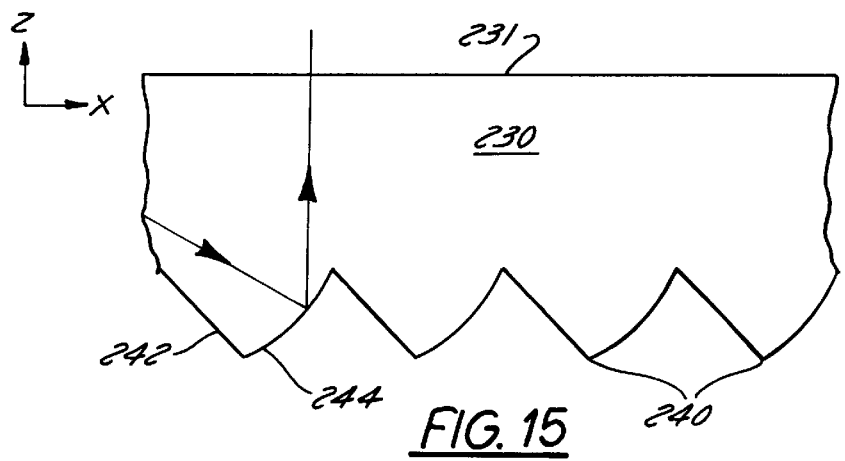
FIG. 15 illustrates a partial sectional view of a collimating waveguide according to the present invention.

Referring to FIG. 15, first collimating waveguide 230 includes top surface 231. First collimating waveguide 230 also includes an incident end (not shown) and a reflective end (not shown). First collimating waveguide 230 is provided with a first plurality of substantially parallel optical elements 240. Each of the first plurality of substantially parallel optical elements 240 includes a first facet 242 and a mirrored second facet 244. Second facet 244 is concave with respect to top surface 231. Although it is not shown, first facet 242 can also be concave with respect to top surface 231.

Referring to FIG. 16, a graphical construction illustrating the proper tangent for any point on second facet 244 is provided. It will be appreciated that the angle S defined by first facet 242 is equivalent to the angular dispersion of the rays incident upon mirrored second facet 244 at the point being considered.

Figure 17A:
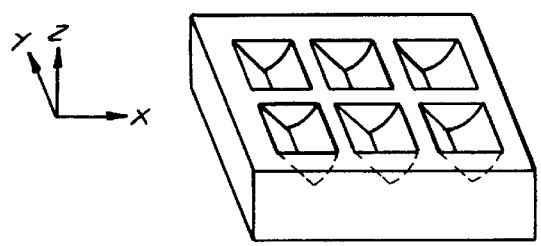
FIG. 17A illustrates a perspective view of a portion of a collimating waveguide according to the present invention.
Figure 17B:
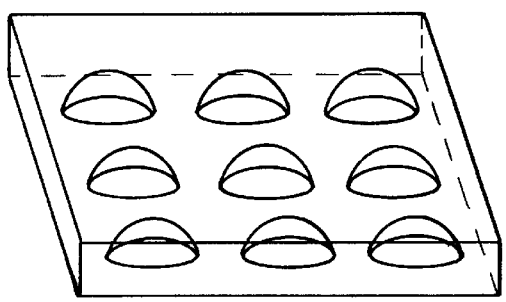
FIG. 17B illustrates a perspective view of a portion of an imaging collimating waveguide according to the present invention.
Figure 17C:
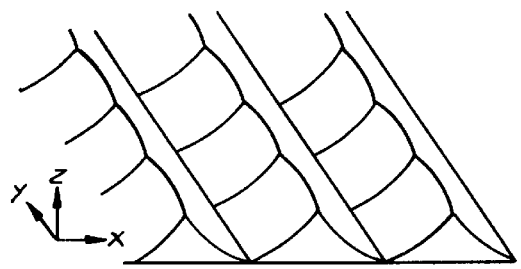
FIG. 17C illustrates a perspective view of a portion of a collimating waveguide according to the present invention.

Referring to FIGS. 17A–17C the aspect ratio of the base of the elements is proportional to the ratio of divergence of the beams in horizontal and vertical.

Referring to FIG. 17A, a first plurality of substantially parallel optical elements having concave facets have been replicated in a first collimating waveguide. It will be appreciated that the first plurality of substantially parallel optical elements are not continuous but rather have been segmented into a series of microchasms.

Referring to FIG. 17B, a second plurality of substantially parallel imaging optics are shown replicated in a second collimating waveguide. It will be appreciated that the second plurality of substantially parallel optical elements have been segmented into spherically symmetric indentations.

Referring to FIG. 17C, a first plurality of substantially parallel optical elements formed in a first collimating waveguide is shown. The first plurality of substantially parallel optical elements have mirrored first facets that are concave and mirrored second facets that are concave. It will be appreciated that concavity of the facets has been three dimensionally deviated so as to define scalloped edges so as to collimate skew rays.

For electrical purposes one light source is often preferred. This also allows for a more compact structural design. However, the use of two sources can be conjunctively combined with an optical element having opposed concave surfaces so as to preferentially direct flux upward where the flux is incident from both sides of the waveguide collimator. This opposed concave configuration is also applicable to the case where one light source is used in conjunction with a mirror on the reflective end of the collimating waveguide. For ease of manufacture a symmetrical identical backside is preferred. This will also effectively collimate much of the backscattered light. However, depending on the geometry, the back surface can be concave in a different configuration from the front surface.

Preferred embodiments of the present invention can be identified one at a time by testing for the presence of collimated output. The test for the presence of collimated output can be carried out without undue experimentation by the use of the simple and conventional polarization experiments. Among the other ways in which to seek embodiments having the attribute of collimated output, guidance toward the next preferred embodiment can be based on the presence of homogeneity.

The disclosed embodiments show a fluorescent bulb as the structure for performing the function of emitting light, but the structure for emitting light can be any other structure capable of performing the function of emitting light, including, by way of example an array of light emitting diodes (LEDs), or any other non-monochromatic light source, such as a strobe light. The illumination source can even be a monochromatic light source, albeit less commercially viable.

The disclosed embodiments show cylindrical and conical microlenses as the structures for performing the function of imaging collimation, but the structure for imaging collimation can be any other structure capable of performing the function of changing the divergence light, including, by way of example a nonlinear optic such as a convection chamber.

The disclosed embodiments show a light shaping diffuser as the structure for performing the function of shaping light, but the structure for shaping light can be any other structure capable of performing the function of shaping light, including, by way of example, a lens such as a Fresnel lens.

A practical application of the present invention which has value within the technological arts is illuminating a liquid crystal display. Further, all the disclosed embodiments of the present invention are useful in conjunction with liquid crystal displays such as are used for the purpose of displaying data, or for the purpose of displaying an image, or the like. There are virtually innumerable uses for the present invention described herein, all of which need not be detailed here.

The present invention described herein provides substantially improved results that are unexpected in that a very good output is obtained with relatively low power. The present invention described herein can be practiced without undue experimentation. The entirety of everything cited above or below is hereby expressly incorporated by reference.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the compactness of the system could be enhanced by providing thinner illumination sources or thinner collimating waveguides. Similarly, although plastic is preferred for the collimating waveguide, any optically refractive material could be used in its place. In addition, the rest of the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which collimate light so as to provide backlighting. Further, although the liquid crystal display system described herein is a physically separate module, it will be manifest that the liquid crystal display may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

REFERENCES

1. W. T. Welford and R. Winston, Optics of Nonimaging Concentrators, Academic Press (1978).
2. R. Winston and T. Jannson, Liouville Theorem and Concentrator Optics, Journal of Optical Society of America A, 3, 7 (1986) and Journal of Optical Society of America A1, 1226 (1984).

What is claimed is:

1. An apparatus, comprising:
   an illumination source for producing light;
   a first collimating waveguide optically connected to said illumination source, said first collimating waveguide including a top surface, an incident end and a first plurality of substantially parallel optical elements for redirecting light from said incident end to, and through, said top surface by total internal reflection, each of said first plurality of optical elements including a concave first facet that is nonparallel to said top surface and a second facet that is nonparallel to said top surface, said second facet being concave with respect to said top surface;

a second collimating waveguide optically connected to said first collimating waveguide, said second collimating waveguide including an upper surface and a second plurality of optical elements for redirecting light from said top surface through said upper surface;

a diffuser for homogenizing light optically connected to said second collimating waveguide; and a reflector optically connected to said light source and optically connected to said first distributed wedge collimating waveguide, said reflector (1) at least partially surrounding said illumination source, and (2) reflecting light from said illumination source to said incident end by direct reflection.

2. The apparatus of claim 1, further comprising a nonimaging optic between said illumination source and said incident surface, said nonimaging optic being optically connected to said illumination source and said first collimating waveguide.

3. The apparatus of claim 1, wherein said diffuser includes a light shaping holographic surface diffuser having at least one diffuser characteristic selected from the group consisting of directional and off-axis.

4. A backlight comprising:
a collimating waveguide having a light input end, a top surface, a bottom surface, and opposing sides;
said bottom surface converging toward said top surface in a direction along said backlight away from said light input end;
said bottom surface comprising a plurality of straight facets having a density $\rho$ distributed along said bottom surface in a direction along said backlight away from said light input end and extending at least part way between said opposing sides;
each said straight facet having a straight facet bottom surface which converges toward said top surface in a direction along said backlight away from said light input end at an angle $\gamma$ less than approximately 5°;
each said straight facet bottom surface of each said straight facet being parallel to each said straight facet bottom surface of each other said straight facet;
said collimating waveguide reflecting light rays entering said light input end in accordance with total internal reflection and entering with an angle greater than said total internal reflection critical angle;
said facets causing light rays entering said light input end and having an angle near said total internal reflection critical angle to exit said top surface at an angle nearly tangential to said top surface.

5. The backlight of claim 4, wherein said facets cause light rays entering said light input end and having an angle near said total internal reflection critical angle to exit said top surface at an angle of approximately $2\gamma$.

6. The backlight of claim 4, wherein each said straight facet bottom surface is reflective to prevent light from leaking from each said straight facet bottom surface.

7. The backlight of claim 4, wherein each said straight facet bottom surface is metalized to prevent light from leaking from each said straight facet bottom surface.

8. The backlight of claim 4, wherein light leaks from each said straight facet bottom surface and from said top surface.

9. The backlight of claim 4, wherein each said straight facet extends between said opposing sides.

10. The backlight of claim 4, wherein said density $\rho$ of said straight facets varies as a function of a distance from said light input end.

11. The backlight of claim 10, wherein said density $\rho$ of said straight facets is such that an intensity of emitted light is uniform across a length of said backlight.

12. The backlight of claim 10, wherein each said straight facet bottom surface is metalized to prevent light from leaking from each said straight facet bottom surface.

13. The backlight of claim 4, further comprising a diffuser optically coupled to said top surface for homogenizing light exiting said top surface.

14. The backlight of claim 13, further comprising a non-Lambertian second diffuser optically coupled to said light input end for reducing reflection from said light input end.

15. The backlight of claim 4, further comprising a non-Lambertian diffuser optically coupled to said light input end for reducing reflection from said light input end.

16. The backlight of claim 4, further comprising a liquid crystal display optically coupled to said collimating waveguide.

17. The backlight of claim 16, further comprising a non-Lambertian diffuser optically coupled to said liquid crystal display for directing light from said liquid crystal display.

18. The backlight of claim 17, further comprising a second diffuser optically coupled to said top surface for homogenizing light exiting from said top surface.

19. The backlight of claim 18, further comprising a non-Lambertian third diffuser optically coupled to said light input end for reducing reflection from said light input end.

20. The backlight of claim 4, further comprising a spatial light modulator optically coupled to said collimating waveguide.

21. The backlight of claim 4, further comprising a light source optically coupled to said light input end.

22. The backlight of claim 21, further comprising a reflector optically coupled to said light source and optically coupled to said light input end of said collimating waveguide, said reflector at least partially surrounding said light source and reflecting light from said light source to said light input end by direct reflection, wherein light from said reflector is directly incident upon said light input end.

23. The backlight of claim 4, further comprising a second collimating waveguide optically coupled to said collimating waveguide, said second collimating waveguide including an upper surface and a second plurality of facets for redirecting light exiting said top surface through and out said upper surface at an angle substantially greater than $2\gamma$ and approximately normal to said top surface.

24. A backlight comprising:
a collimating waveguide having a light input end, a top surface, a bottom surface, and opposing sides;
said bottom surfaces converging toward said top surface in a direction along said backlight away from said light input end;
said bottom surface comprising a plurality of straight facets having a density $\rho$ distributed along said bottom surface in a direction along said backlight away from said light input end and extending at least part way between said opposing sides;
each said straight facet having a straight facet bottom surface which converges toward said top surface in a direction along said backlight away from said light input end at an angle less than approximately 5°;
each said straight facet bottom surface of each said straight facet being parallel to each said straight facet bottom surface of each other said straight facet;
said collimating waveguide reflecting light rays entering said light input end in accordance with total internal reflection and at an angle greater than a total internal reflection critical angle;

said facets causing light entering said light input end and having an angle near said total internal reflection critical angle to exit said top surface at an angle nearly tangential to said top surface and of approximately 2γ;

a second collimating waveguide optically coupled to said collimating waveguide, said second collimating waveguide including an upper surface and a second plurality of facets for redirecting light exiting said top surface through and out said upper surface at an angle substantially greater than 2γ and approximately normal to said top surface;

a non-Lambertian diffuser optically coupled to said second collimating waveguide for directing light exiting said second collimating waveguide.

25. The backlight of claim 24, wherein said non-Lambertian diffuser provides a controllable output angle determined by surface features replicated in said non-Lambertian diffuser from speckle recorded in a photosensitive medium which determine angular output characteristics of said non-Lambertian diffuser.

26. The backlight of claim 24, wherein said second collimating waveguide is integral with said non-Lambertian diffuser.

27. The backlight of claim 25, wherein γ is in the range 0.5°–2.0°.

28. A backlight comprising:

a collimating waveguide having a light input end, a top surface, a bottom surface, and opposing sides;

said bottom surfaces converging toward said top surface in a direction along said backlight away from said light input end;

said bottom surface comprising a plurality of straight facets distributed along said bottom surface in a direction along said backlight away from said light input end and extending at least part way between said opposing sides;

each said straight facet having a straight facet bottom surface arranged substantially parallel to said bottom surface which converges toward said top surface in a direction along said backlight away from said light input end at an angle less than approximately 5°; and wherein said straight facet bottom surfaces cause light rays entering said light input end and having an angle near said total internal reflection critical angle to exit said top surface at an angle nearly tangential to said top surface.

29. The backlight of claim 28, wherein said bottom surface converges toward said top surface at an angle between 0.5° to 2.0°.

30. The waveguide of claim 28 wherein said collimating waveguide reflects light rays entering said light input end in accordance with total internal reflection and at an angle greater than a total internal reflection critical angle.

31. The waveguide of claim 28 wherein said straight facet bottom surfaces cause light rays entering said light input end and having an angle near said total internal reflection critical angle to exit said top surface at an angle to said top surface and of approximately 2γ.

32. The waveguide of claim 28, wherein the facets have an density distribution along said bottom surface that varies as a function of a direction along said backlight away from said light input end.

33. The waveguide of claim 28, wherein each said straight facet bottom surface of each said straight facet is parallel to each said straight facet bottom surface of each other said straight facet.

34. The backlight of claim 28, wherein said facets cause light rays entering said light input end and having an angle near said total internal reflection critical angle to exit said top surface at an angle of approximately 2γ.

35. The backlight of claim 28, wherein each said straight facet bottom surface is reflective to prevent light from leaking from each said straight facet bottom surface.

36. The backlight of claim 28, wherein each said straight facet bottom surface is metalized to prevent light from leaking from each said straight facet bottom surface.

37. The backlight of claim 28, wherein light leaks from each said straight facet bottom surface and from said top surface.

38. The backlight of claim 28, wherein each said straight facet extends between said opposing sides.

39. The backlight of claim 28, wherein said density ρ of said straight facets varies as a function of a distance from said light input end.

40. The backlight of claim 39, said density ρ of said straight facets is such that an intensity of emitted light is uniform across a length of said backlight.

41. The backlight of claim 39, wherein each said straight facet bottom surface is metalized to prevent light from leaking from each said straight facet bottom surface.

42. The backlight of claim 28, further comprising a diffuser optically coupled to said top surface for homogenizing light exiting said top surface.

43. The backlight of claim 42, further comprising a non-Lambertian second diffuser optically coupled to said light input end for reducing reflection from said light input end.

44. The backlight of claim 28, further comprising a non-Lambertian diffuser optically coupled to said light input end for reducing reflection from said light input end.

45. The backlight of claim 28, further comprising a liquid crystal display optically coupled to said collimating waveguide.

46. The backlight of claim 28, further comprising a non-Lambertian diffuser optically coupled to said liquid crystal display for directing light from said liquid crystal display.

47. The backlight of claim 46, further comprising a second diffuser optically coupled to said top surface for homogenizing light exiting from said top surface.

48. The backlight of claim 47, further comprising a non-Lambertian third diffuser optically coupled to said light input end for reducing reflection from said light input end.

49. The backlight of claim 28, further comprising a spatial light modulator optically coupled to said collimating waveguide.

50. The backlight of claim 28, further comprising a light source optically coupled to said light input end.

51. The backlight of claim 39, further comprising a reflector optically coupled to said light source and optically coupled to said light input end of said collimating waveguide, said reflector at least partially surrounding said light source and reflecting light from said light source to said light input end by direct reflection, wherein light from said reflector is directly incident upon said light input end.

52. A backlight comprising:

a collimating waveguide having a light input end, a top surface, a bottom surface, and opposing sides, said bottom surface converging toward said top surface in a direction along said backlight away from said light input end, said bottom surface comprising a plurality of curved facets distributed along said bottom surface in a direction along said backlight away from said light input end and extending at least part way between said opposing sides, each said curved facet having a curved facet bottom surface, each said curved facet bottom surface being arranged to reflect a ray-bundle incident to said curved facet bottom surface, and wherein said ray-bundle comprises a plurality of light rays and wherein each of said light rays is reflected substantially normally to the top surface in a symmetrical distribution.

53. The backlight of claim 52, wherein said plurality of curved facets are arranged in an array distributed on said bottom surface.

54. The backlight of claim 52, wherein said plurality of curved facets are arranged in a segmented array.

55. The backlight of claim 52, wherein said plurality of curved facets are arranged into segments, each said segment being arranged parallel to each other said segment.

56. The backlight of claim 52, wherein said plurality of curved facets are distributed with an increasing density ρ from said light input end.

57. The backlight of claim 52, wherein said density ρ of said straight facets is such that an intensity of emitted light is uniform across a length of said backlight.

58. The backlight of claim 27, wherein each of said plurality of curved facets are concave with respect to said top surface.

59. The backlight of claim 54, wherein said bottom surface converges towards said top surface at an angle less than about 5°.

60. The backlight of claim 54, wherein said bottom surface converges toward said top surface at an angle of about 0.50°–2.0°.

61. The backlight of claim 54, wherein said collimating waveguide further comprises a second light input end opposing said light input end, said bottom surface further comprising a plurality of second curved facets each opposing said plurality of curved facets and each having a second curved facet bottom surface, each said second curved facet being arranged to reflect a second ray-bundle incident to said second curved facet bottom surface, and wherein said second ray-bundle comprises a plurality of light rays and wherein each of said light rays are reflected substantially normally to the top surface and in a symmetrically distribution.

62. The backlight of claim 61, wherein each said second curved facet is concave with respect to said top surface.

63. The backlight of claim 61, wherein each said curved facet and each said second curved facet is concave with respect to said top surface.

64. The backlight of claim 61, wherein each said curved facet and each said second curved facet is arranged with scalloped edges, said scalloped edges collimating skew light rays.

65. The backlight of claim 62, wherein each said curved facet and each said second curved facet are arranged to preferentially direct a light flux substantially normal to said top surface.

66. The backlight of claim 65, wherein light flux enters said waveguide collimator from said light input end and said second light input end.

67. A backlight comprising:

a collimating waveguide having a light input end, a top surface, a bottom surface, and opposing sides, said bottom surface converging toward said top surface in a direction along said backlight away from said light input end, said bottom surface comprising a plurality of curved facets having a density distributed along said bottom surface in a direction along said backlight away from said light input end and extending at least part way between said opposing sides, each said curved facet having a curved facet bottom surface, each said curved facet bottom surface being curved substantially in accordance with the equation:

$$x(z) = \int_0^z \tan\left[\frac{\pi+\beta}{4} + \frac{1}{4}\arctan\left(\frac{w-z'}{G}\right)\right] dz'$$

where β is the angle of a highest inclination incident ray and w and G are dimensions of said curved facet; and said plurality of curved facets causing light entering said light input end and reflecting from said plurality of curved facets to reflect from each said curved facet bottom surface symmetrically with respect to an axis normal to said top surface.

* * * * *